United States Patent
Linard et al.

(10) Patent No.: US 8,070,581 B2
(45) Date of Patent: Dec. 6, 2011

(54) REGULATED GAMING—STAGING MULTI-ACT GAMES

(75) Inventors: Sylvie Linard, London (GB); John Papanastasiou, Croydon (GB); Thierry Brunet de Courssou, Henderson, NV (US)

(73) Assignee: IGT, Reno, NV (US)

( * ) Notice: Subject to any disclaimer, the term of this patent is extended or adjusted under 35 U.S.C. 154(b) by 1341 days.

(21) Appl. No.: 11/562,943

(22) Filed: Nov. 22, 2006

(65) Prior Publication Data

US 2007/0265053 A1    Nov. 15, 2007

Related U.S. Application Data

(60) Provisional application No. 60/738,812, filed on Nov. 22, 2005.

(51) Int. Cl.
*A63F 9/24* (2006.01)
(52) U.S. Cl. .............. 463/16; 463/20; 463/1; 273/138.1
(58) Field of Classification Search ............... 463/16, 463/20; 273/138.1
See application file for complete search history.

(56) References Cited

U.S. PATENT DOCUMENTS

| | | | |
|---|---|---|---|
| 4,593,904 A | 6/1986 | Graves | |
| 4,695,053 A | 9/1987 | Vazquez, Jr. et al. | |
| 5,342,049 A | 8/1994 | Wichinsky et al. | |
| 5,823,873 A | 10/1998 | Moody | |
| 6,012,983 A | 1/2000 | Walker et al. | |
| 6,019,374 A | 2/2000 | Breeding | |
| 6,050,895 A | 4/2000 | Luciano, Jr. et al. | |
| 6,077,163 A | 6/2000 | Walker et al. | |
| 6,234,896 B1 * | 5/2001 | Walker et al. | 463/16 |
| 6,244,957 B1 | 6/2001 | Walker et al. | |
| 6,267,669 B1 | 7/2001 | Luciano, Jr. et al. | |
| 6,283,474 B1 | 9/2001 | de Keller | |
| 6,288,993 B1 | 9/2001 | Kawahara et al. | |
| 6,409,597 B1 | 6/2002 | Mizumoto | |
| 6,500,068 B2 * | 12/2002 | Walker et al. | 463/25 |
| 6,517,433 B2 | 2/2003 | Loose et al. | |

(Continued)

FOREIGN PATENT DOCUMENTS

WO    WO0141892 A2    6/2001

OTHER PUBLICATIONS

Pipe Dream Instruction Manual, Nintendo Entertainment System, 1990.*

(Continued)

*Primary Examiner* — David L Lewis
*Assistant Examiner* — Chase Leichliter
(74) *Attorney, Agent, or Firm* — Young Law Firm, P.C.

(57) ABSTRACT

Creative multi-act games for the younger generation of casino players accustomed to creative simulation games such as "The Sims®" and familiar TV characters such as the cast of "Friends." Stories unfold through acts that have been staged by the player by selecting and placing acting objects. A palette of betting opportunities may be provided in each act in accordance with the staged act to allow the player(s) to place bets. A typical storyboard may include three acts: (a) a construction act, (b) a testing act and (c) a destruction or resolution act. The unfolding of acts may be non-linear and several players may participate simultaneously, sharing the opportunity to affect a storyboard's direction through decision-making.

62 Claims, 21 Drawing Sheets

U.S. PATENT DOCUMENTS

| | | | |
|---|---|---|---|
| 6,522,312 | B2 | 2/2003 | Ohshima et al. |
| 6,761,632 | B2 | 7/2004 | Bansemer et al. |
| 6,811,482 | B2 | 11/2004 | Letovsky |
| 6,893,341 | B2* | 5/2005 | Walker et al. .................. 463/9 |
| 2002/0053089 | A1* | 5/2002 | Massey ..................... 725/135 |
| 2002/0147040 | A1 | 10/2002 | Walker et al. |
| 2003/0195029 | A1* | 10/2003 | Frohm et al. ................. 463/16 |
| 2003/0211881 | A1 | 11/2003 | Walker et al. |
| 2004/0102238 | A1 | 5/2004 | Taylor |
| 2004/0198496 | A1 | 10/2004 | Gatto et al. |
| 2005/0040601 | A1 | 2/2005 | Yoseloff et al. |
| 2005/0054445 | A1 | 3/2005 | Gatto et al. |
| 2005/0071023 | A1* | 3/2005 | Gilliland et al. ............. 700/91 |
| 2005/0192091 | A1* | 9/2005 | Siewert et al. ............... 463/31 |
| 2006/0003832 | A1* | 1/2006 | Mincey et al. ............... 463/25 |
| 2006/0205492 | A1 | 9/2006 | Linard et al. |

OTHER PUBLICATIONS

Sim City 2000 Instruction Manual, Super Nintendo, 1996.*
The Oregon Trail 5th Edition Instruction Manual, PC, 2001.*
International Search Report mailed Apr. 24, 2008, in corresponding International Application No. PCT/US06/61230, filed Nov. 22, 2006.
Written Opinion of the International Searching Authority mailed Apr. 24, 2008, in corresponding International Application No. PCT/US06/61230, filed Nov. 22, 2006.
International Preliminary Report on Patentability and Written Opinion of the International Searching Authority in corresponding PCT application PCT/US2006/061230.
Extended European Search Report of Jul. 22, 2011 in related EP application 06840014.2.

* cited by examiner

FIG. 2
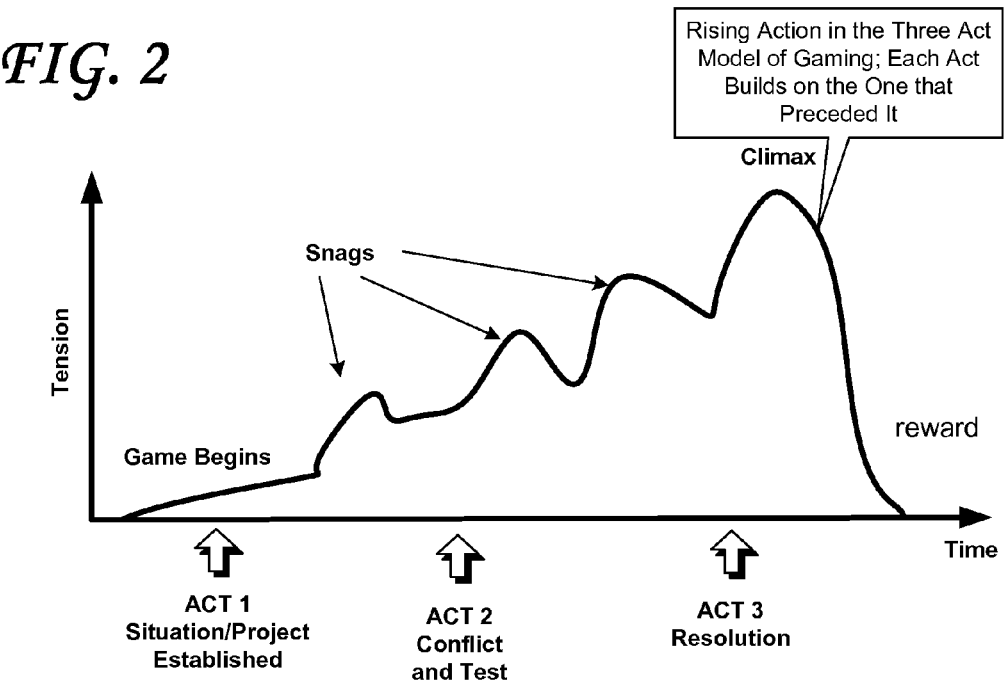
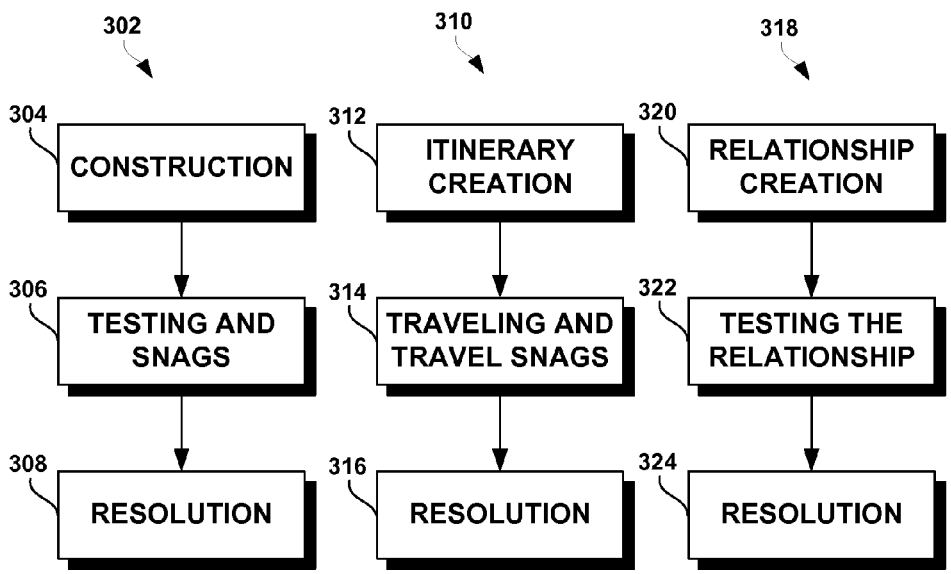
FIG. 3

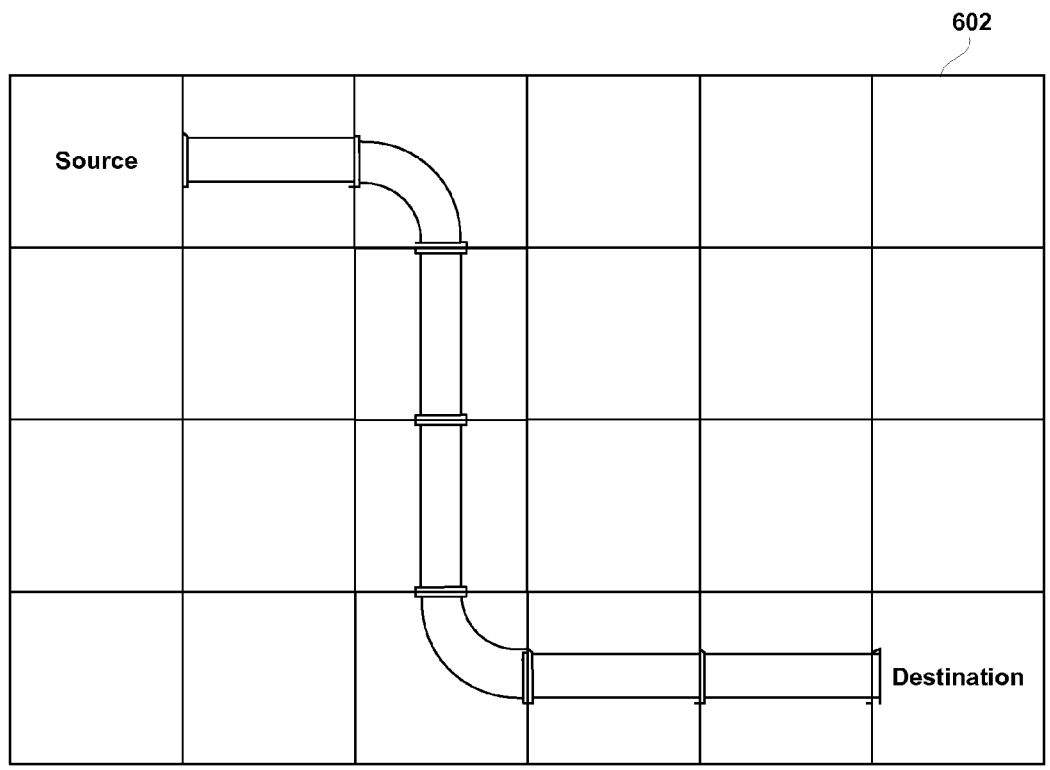
FIG. 6
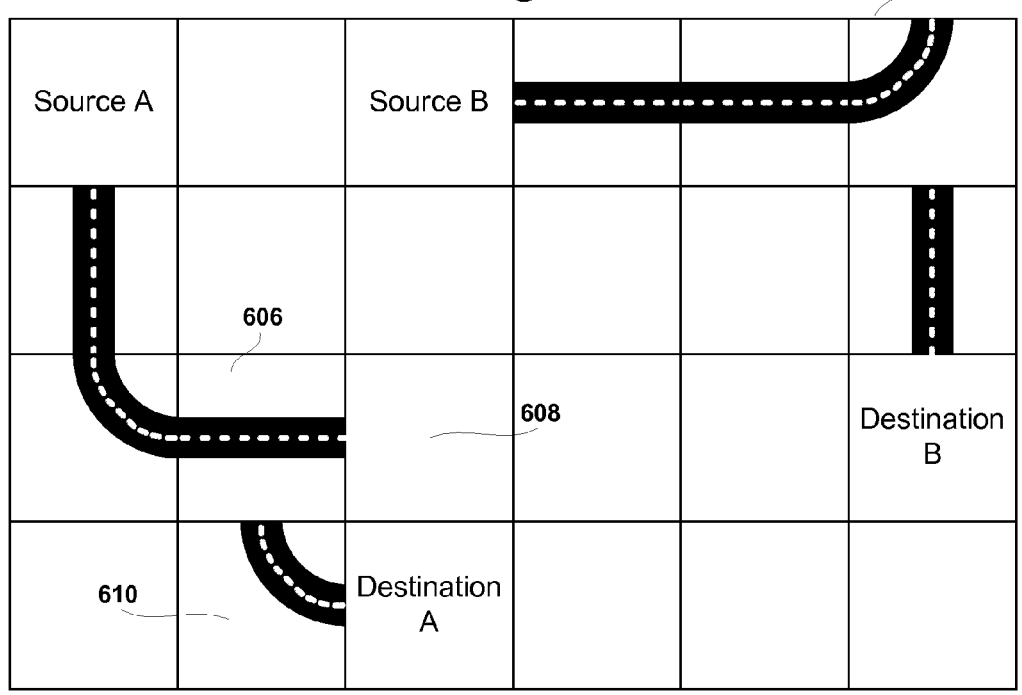

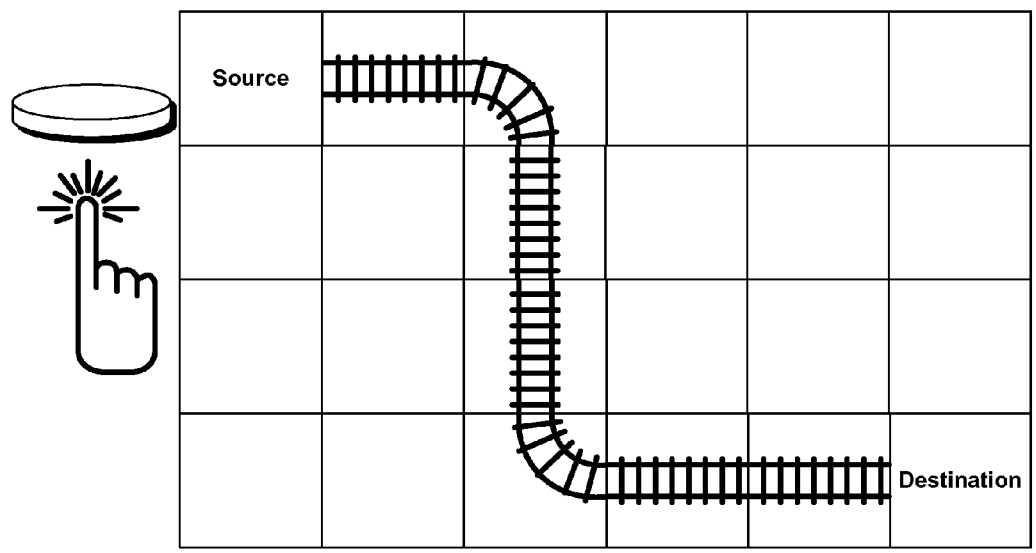
FIG. 11
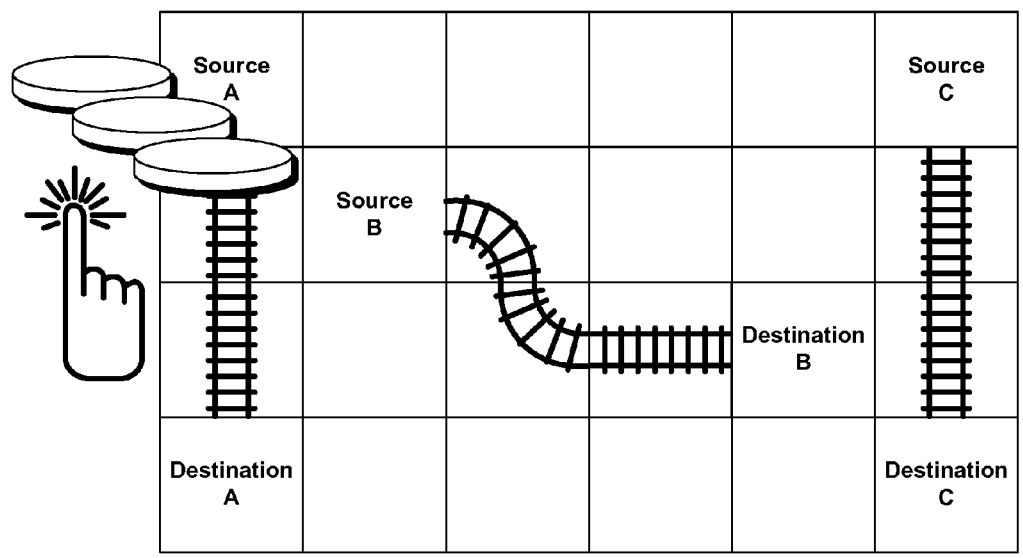

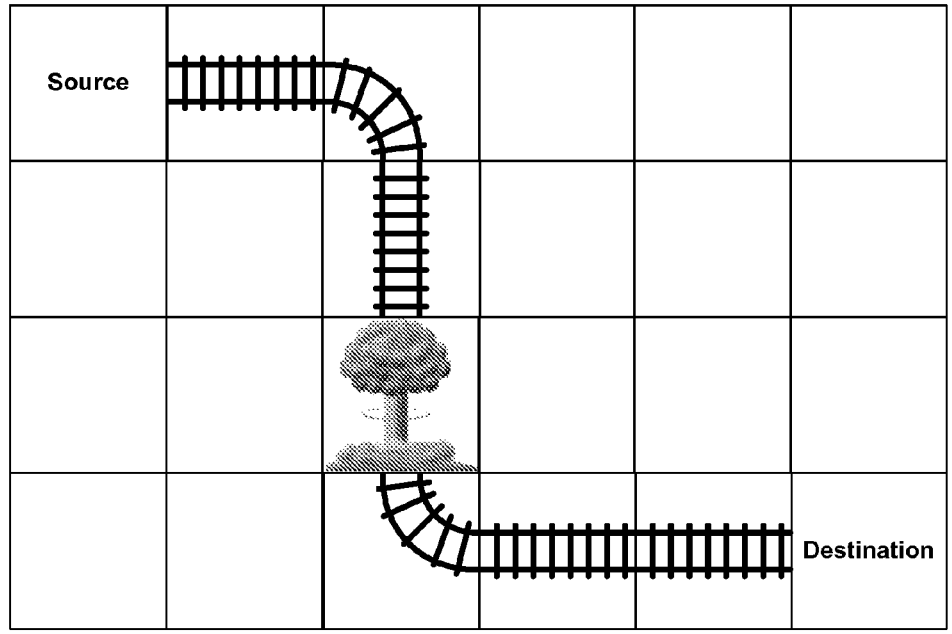
*FIG. 13B*
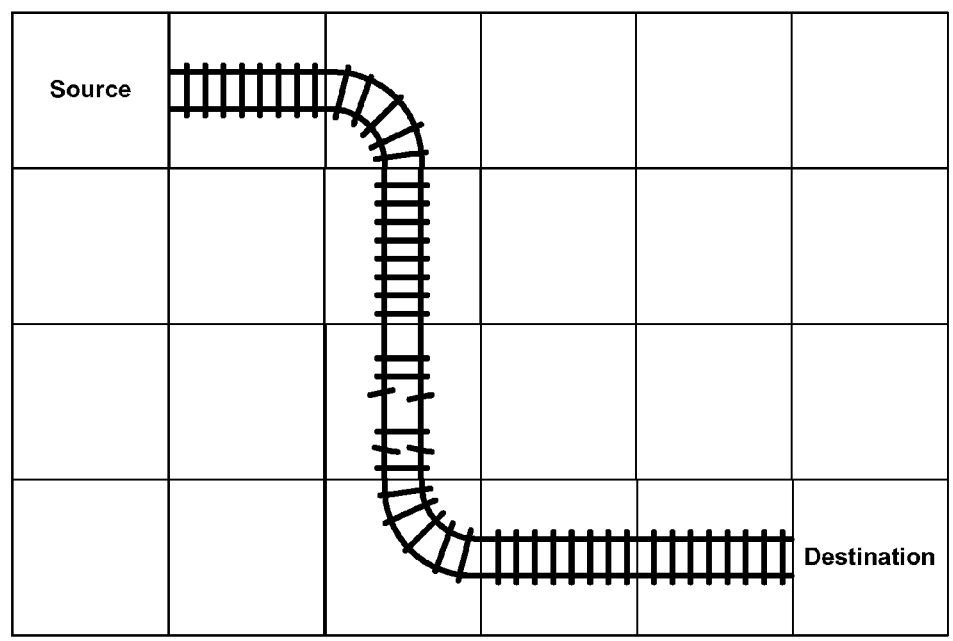

REGULATED GAMING—STAGING MULTI-ACT GAMES

CROSS REFERENCE TO RELATED CASES

This application claims the benefit under 35 U.S.C. §119 (e) of Provisional Application Ser. No. 60.738,812, filed Nov. 22, 2005, and is related to application Ser. No. 11/562,915, filed Nov. 22, 2006, both applications of which are hereby incorporated herein by reference in their entireties.

BACKGROUND OF THE INVENTION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings referred to herein: Copyright 2005, Cyberscan Technology, Inc., All Rights Reserved.

FIELD OF THE INVENTION

This invention relates generally to the field of regulated pay computer-controlled games, either games of skill or games of chance.

DESCRIPTION OF THE PRIOR ART AND RELATED INFORMATION

The majority of computer games of chance such as found in casinos are based on, or directly derived from, reel slot machines or video poker. Many of the new generation of video slot machines have captured the public's imagination and betting dollars by replacing the fruit and poker symbols of the past with colorful, larger-than-life characters and by adding new and exciting features like multi-line play, secondary game play, wide-area progressive jackpots and rich animation sequences. While generally not as visually appealing as the new slot machines, video poker machines remain popular because they afford the player the ability to use skill and decision-making to affect the game's outcome. Interestingly, despite achieving tremendous popularity in the home video gaming market, puzzle video games like Tetris®, Bejeweled®, or strategy/construction simulation games such as SimCity®, or role simulation games such as the Sims®, which are also based on skill and decision-making, have made no inroads into the casino electronic game arena. These games are far too complex or culturally remote for slot managers or legacy game manufacturers to consider offering them to the current generation of casino players.

SUMMARY OF THE INVENTION

According to an embodiment thereof, the present invention may be viewed as a pay game of chance or skill that includes a plurality of acts (e.g., two or more) consistent with a predetermined storyboard. The game unfolds a story through acts staged by the player by selecting and placing acting objects. A palette of betting opportunities is proposed in each act in accordance with the staged act allowing players to place bets on one or more randomly drawn events within each act.

According to further embodiments, the acts may be caused to unfold sequentially. Alternatively, the acts may be caused to unfold in a non-sequential order. Each of the acts may be associated with a sequence identifier and the acts may be caused to unfold in a sequential order, a non-sequential order, a random sequence order or an order selected by the player. Alternatively still, each of the acts may be associated with a sequence identifier and the acts may be caused to unfold in a sequence order consistent with a randomly drawn outcome, a bonus outcome and/or a mystery outcome, for example.

The game may be played on a gaming machine coupled to a network of a plurality of other gaming machines having the same or a similar game. Each of the acts may be associated with a sequence identifier and the acts may be caused to unfold in a sequence order consistent with a randomly drawn outcome occurring on another gaming machine. Betting opportunities may be presented, for example, via a pop-up palette or in a roll-up panel palette. Betting opportunities are preferably consistent with the storyboard. Wager amounts to be placed on the betting opportunities may be presented, for example, via a pop-up Palette of Chips or in a roll-up panel Palette of Chips. The Palette of Chips maybe consistent with the storyboard.

There may be at least one Palette of Betting Opportunities for each act, and each palette may represent a different theme consistent with the storyboard. There may be at least one Palette of Chips for each Palette of Betting Opportunities.

The storyboard may include. a quest game, an adventure game, a strategy game, a role game and/or construction game, to name but a few possibilities.

For example, the acts may include, consistent with selected storyboard that may include a plurality of acts such as, for example:
- (a) Construction, (b) Testing and (c) Destruction;
- (a) Itinerary creation, (b) Traveling and (c) Travel snags or difficulties;
- (a) Creating a relationship, (b) Living the relationship, (c) Complications affecting the relationship;
- (a) Selecting players, their personality and their gaming style for a (e.g., Poker) game and (b) playing the Poker game.
- (a) Establish the premise; (b) Unfold the premise, (c) Complicate the premise, and (d) Resolution of the premise. Other acts may be developed and implemented, as the foregoing list is not intended to limit the range of possibilities falling within the scope of the present inventions.

For example, the construction act may include an assembly of (e.g., water) pipes from a part factory, the testing act may include a step or steps of causing water to flow into the water pipes constructed during the construction act, and the destruction act may include the destruction act may include the pipes failing through bursting by freezing, accidental drilling through a pipe, corrosion, seal cracking and like calamities.

One or more of the acts may include a "Mystery Snag" Palette of betting Opportunities, which may include any problem, difficulty, manmade or natural disaster, complication and the like on which the player may pace a bet.

According to a still further embodiment, the present invention is a pay game of chance or skill that includes a plurality (i.e., two or more) of acts in which at least one Palette (available range) of Betting Opportunities allowing placing bets on a plurality of events may be offered for each act and in which the placed bets are played for each act.

Accordingly, an embodiment of the present invention is a regulated creative game of chance for a video gaming machine, comprising A computer; at least one display; a plurality of acts, each configured to unfold on the display(s) in accordance with a predetermined storyline; a plurality of stages, each of the stages being associated with at least one of the plurality of acts; an interface configured to enable a player to select one of the plurality of acts and to cause the display(s) to show a stage associated with the selected one of the plurality of acts; a selection palette displayed on the at least one display, the selection palette including at least one acting object that is related to the selected act and to the associated stage shown on the display; a palette of betting opportunities; the interface being further configured to enable the player to prepare the stage by enabling the player to select the acting object(s) from the selection palette and to add the selected acting object(s) to the associated stage, the interface being further configured to enable the player to select at least one betting opportunity from the palette of betting opportunities and to place at least one bet, the betting opportunity or opportunities being related to a preparation of the associated stage shown on the display, and a random number generator coupled to the computer to determine an outcome of the bet(s) subsequent to the player activating a bet command.

The interface may be further configured to enable the player to remove the added acting object(s) from the associated stage. Each of the acting object(s) may farther include one or more attributes and, the interface may be further configured to enable the player to modify at least one attribute of the added acting object(s). The attribute(s) of the added acting object(s) may include hair color when the acting object is a person, the make and/or model when the acting object is a car, and placement, orientation and/or quality when the acting object is a part. The interface may be configured to enable the player to activate the bet command a plurality of times during each of the plurality of acts. The predetermined storyline may be initialized in a first act, tested in a second act and resolved in a third act. The associated stage may include a game play grid that may include a plurality of grid segments and the interface may be farther configured to enable the player to place the selected acting object(s) on one or more of the plurality of grid segments. The game play grid may be fragmented in a regular or irregular manner. The game play grid may be three-dimensional. The game play grid may include a map and each grid segment represents a province or territory, for example.

The predetermined storyline may include an unfolding of a construction project. The construction project may include a first act that may include building the construction project, a second act that may include testing the construction project and discovering construction snags and a third act that may include a resolution of the discovered construction snags (problems, issues, difficulties, etc.) The construction project may include a completion of a road, a pipeline, railroad tracks, an electrical wiring, a river, a labyrinth and/or an ignition cord, for example. The acting object(s) of the selection palette may include factory parts to be added to the associated stage to build or improve the construction project. The acting object(s) of the selection palette may include damaging elements that may damage or to destroy the construction project. The damaging elements may include, for example, a tornado, an earthquake, an explosion, lightning, a meteor, a plane crash, a tsunami, an accidental perforation by a drill, an accidental rupture while digging a trench, a power grid failure, a hailstorm, a heat wave, a flood, a land slide, a poisoned water supply, a flat tire, a terrorist attack and/or a poor quality of a construction material, to name but a few possibilities.

The predetermined storyline may include a construction of a conduit for a liquid or an object to move from a source to a destination, the conduit including a plurality of conduit segments. An act of the plurality of acts may include an assembly of the conduit, the acting object(s) may include an assembly part or a material associated with the assembly of the conduit, the betting opportunity or opportunities may include a part type, part rotation, part size and/or part material compatibility (for example) and, subsequent to the player activating the bet command, the liquid or object may be shown on the display(s) attempting to advance from the source to the destination up to a location of a snag (leak, obstacle, obstruction, etc.) that stops or reduces a flow of the liquid or object, as determined by the computer with input from the random number generator.

An act of the plurality of acts may include a testing of a fully assembled conduit, the acting object(s) may include a source designation, a destination designation and/or a liquid type or a type of moving object related to the conduit and the betting opportunity or opportunities may include fitting quality, material quality, corrosion state, degradation state, operating pressure and/or blow-out pressure of the conduit segments (for example) and, subsequent to the player activating the bet command, the liquid or object may be shown attempting to advance from the source to the destination up to a location of a snag that stops or reduces a flow of the liquid or object, as determined by the computer with input from the random number generator.

Another act of the plurality of acts may include a resolution of a fully assembled but damaged conduit, the acting object(s) may include a replacement part, an improved material, a fixing procedure and/or a tool related to the repair of the conduit (to name a few possibilities), the betting opportunity or opportunities may include fitting quality, material quality, corrosion state, degradation state, operating pressure and/or blow-out pressure, for example, and subsequent to the player activating the bet command, the liquid or object may be shown attempting to advance from the source to the destination up to a location of a snag that stops or reduces a flow of the liquid or object, as determined by the computer with input from the random number generator.

The predetermined storyline may include a journey of a character. The plurality of acts may include a first act in which a travel itinerary for the character is created, a second act in which the character travels along the created itinerary and overcomes travel snags (obstacles, difficulties, delays, etc.) and a third act that may include a resolution of the journey. The journey may include, for example, a hero's quest and/or a military mission. The predetermined storyline may include an emotional journey. The predetermined storyline may include a creation of a relationship. The plurality of acts may include a first act in which the relationship is created, a second act in which the relationship is tested and a third act in which the relationship is resolved. The relationship may include a romantic relationship.

Another embodiment of the present invention is a method of operating a video gaming machine to provide a player with a regulated creative game of chance, comprising the steps of providing a plurality of acts that unfold in accordance with a predetermined storyline; prompting the player to select an act of the plurality of acts; displaying a stage associated with the selected act; providing a selection palette that may include at least one acting object, the acting object(s) being related to the selected act and to the displayed associated stage; prompting the player to select at least one acting object from the selection palette and adding the selected acting object(s) to the associated stage; providing a palette of betting opportunities related to the selected acting object(s) and to the associated stage; prompting the player to select at least one betting opportunity from the provided palette of betting opportunities and to place at least one bet, the betting opportunity or opportunities being related to the associated stage, and determining an outcome of the bet(s) in accordance with the selected betting opportunity or opportunities subsequent to the player activating a bet command.

The method may also include a step of enabling the player to remove the added acting object(s) from the associated stage. Each of the acting object(s) may further include one or more attributes and, the method further may include a step of enabling the player to modify the attribute(s) of the added acting object. The attribute(s) of the added acting object(s) may include hair color when the acting object is a person, the make and/or model when the acting object is a car, and placement, orientation and/or quality when the acting object is a part. The method may also include a step of enabling the player to activate the bet command a plurality of times during each of the plurality of acts. The predetermined storyline may be configured to be initialized in a first act, tested in a second act and resolved in a third act. The associated stage (setting of the act) may include a game play grid that may include a plurality of grid segments. The method may further include a step of enabling the player to place the selected acting object(s) on one or more of the plurality of grid segments. Steps of fragmenting he game play grid in a regular or irregular manner may be carried out. A step of providing the game play grid in a three-dimensional form may also be carried out. The method may also include a step of providing the game play grid with a map in which each grid segment represents a province, state, district, territory or any geographical or geopolitical entity.

The method may further include a step of configuring the predetermined storyline to include an unfolding of a construction project. A step may be carried out of configuring the construction project to include a first act that includes building the construction project, a second act that includes testing the construction project and discovering construction snags and a third act that includes a resolution of the discovered construction snags. A step of configuring the construction project to include a completion of a road, a pipeline, railroad tracks, an electrical wiring, a river, a labyrinth and/or an ignition cord (for example) may also be carried out. The method may also include a step of configuring the acting object(s) of the selection palette to include factory parts to be added to the associated stage to build or improve the construction project. The method may also include a step of configuring the acting object(s) of the selection palette to include damaging elements that may damage or to destroy the construction project. A step may be carried out of configuring the damaging elements to include a tornado, an earthquake, an explosion, lightning, a meteor, a plane crash, a tsunami, an accidental perforation by a drill, an accidental rupture while digging a trench, a power grid failure, a hailstorm, a heat wave, a flood, a land slide, a poisoned water supply, a flat tire, a terrorist attack, and/or a poor quality of a construction material, for example.

A step may be carried out of configuring the predetermined storyline to include a construction of a conduit for a liquid or an object to move from a source to a destination, the conduit including a plurality of conduit segments. The method may also include a step of configuring an act of the plurality of acts to include an assembly of the conduit, the acting object(s) may include an assembly part and/or a material associated with the assembly of the conduit, the betting opportunity or opportunities may include a part type, part rotation, part size and/or part material compatibility (for example) and, subsequent to the player activating the bet command, the liquid or object may be shown on the display(s) attempting to advance from the source to the destination up to a location of a snag that stops or reduces a flow of the liquid or object, as determined by the outcome determining step. The method may also include a step of configuring an act of the plurality of acts to include a testing of a filly assembled conduit, the acting object(s) may include a source designation, a destination designation and/or a liquid type or a type of moving object related to the conduit and the betting opportunity or opportunities may include fitting quality, material quality, corrosion state, degradation state, operating pressure and/or blow-out pressure of the conduit segments (for example) and, subsequent to the player activating the bet command, the liquid or object may be shown attempting to advance from the source to the destination up to a location of a snag that stops or reduces a flow of the liquid or object, as determined by the outcome determining step.

The method may further include a step of configuring an act of the plurality of acts to include a resolution of a fully assembled but damaged conduit, the acting object(s) may include, for example, a replacement part, an improved material, a fixing procedure and/or a tool related to the repair of the conduit, the betting opportunity or opportunities may include fitting quality, material quality, corrosion state, degradation state, operating pressure and/or blow-out pressure (for example) and, subsequent to the player activating the bet command, the liquid or object may be shown attempting to advance from the source to the destination up to a location of a snag that stops or reduces a flow of the liquid or object, as determined by the outcome determining step.

A step of configuring the predetermined storyline may include a journey of a character may also be included. A step may be carried out of configuring the plurality of acts to include a first act in which a travel itinerary for the character is created, a second act in which the character travels along the created itinerary and overcomes travel snags and a third act that includes a resolution of the journey.

The method may also include a step of configuring the journey to include a hero's quest and/or a military mission, for example. The method may also include a step of configuring the predetermined storyline to include an emotional journey. A step may be carried out of configuring the predetermined storyline to include a creation of a relationship. A step may also be carried out of configuring the plurality of acts to include a first act in which the relationship is created, a second act in which the relationship is tested and a third act in which the relationship is resolved. The method may also include a step of configuring the relationship to include a romantic relationship.

Yet another embodiment of the present invention is a regulated creative game of chance for a gaming machine, comprising a conduit shown on a display of the gaming machine laid out in a first uncompleted state; an interface configured to enable a player of the regulated game of chance to bet on whether the conduit will be shown laid out on the display in a second completed state that enables at least one of a liquid and an object to flow or move within the completed conduit from a source to a destination, and a random outcome generator configured to, after the player activates a bet command, determine the layout of the conduit in the second completed state, and determine an outcome amount of the selected bet subsequent to the player activating a bet command.

The regulated creative game may include a first animation that may be initiated subsequent to the player activating the bet command and subsequent to the conduit being shown in the second completed state that enables the liquid and/or the object to successfully flow or move within the completed conduit from the source to the destination. A second animation may be provided that may be initiated subsequent to the player activating the bet command and subsequent to the conduit being shown in a second completed state that does not enable the liquid and/or the object to successfully flow or move within the completed conduit from the source to the destination. The conduit may include a plurality of conduit segments and, subsequent to the player activating the bet command and subsequent to the conduit being shown in a second completed state, the outcome amount may be a function of at least one of a quality factor associated with conduit segments of the conduit in the second completed state, as selected by the random outcome generator. The quality factor may include a leaky conduit segment, an undersize conduit segment, a partly obstructed conduit segment, an inferior quality conduit segment, a non genuine conduit segment, a faulty conduit segment and/or a damaged conduit segment, for example.

A still further embodiment of the present invention is a regulated creative game of chance for a video gaming machine, comprising: a plurality of acts unfolding in accordance with a predetermined storyline, the storyline including a conduit construction act, a conduit testing act and a conduit destruction act; an interface configured to enable a player of the video gaming machine to select one of the plurality of acts and to cause a display of a stage associated with the selected act; a selection palette including at least one acting object, the acting object(s) including at least one of conduit segments, construction parts, moving objects, sources, destinations and damaging elements. The interface may be further configured to enable the player to prepare the selected act, including selecting at least one acting object from the selection palette and adding the selected acting object(s) to the stage associated with the selected act under preparation, enable the player to modify the preparation of the selected act including selecting at least one added acting object, modifying the attribute of the added acting object(s) or removing the added acting object(s), and enable the player to select at least one betting opportunity, the betting opportunity or opportunities being related to a state of the preparation of the stage; a random outcome generator configured to, after the player activates a bet command, determine an outcome in accordance with the selected betting opportunity or opportunities, the conduit construction act may include a construction of the conduit(s) using a corresponding one of the acting object(s) and a designation of a source and a destination for each of the conduit (s) using a corresponding one of the acting object(s), the conduit testing act may include a selection of a moving object to be guided within each of the conduit(s) using a corresponding one of the acting object(s), and the conduit destruction act may include a selection of one or more damaging element to damage the conduit using a corresponding one of the acting object(s).

The plurality of acts may be combined into a single act. The interface may be further configured to enable the player to modify the preparation of an act within a predetermined time. The predetermined time may be a function of a location of the object moving within each of the conduit(s) from the source to the destination. The predetermined time may be elapsed when the object moving within each of conduit(s) reaches the destination. The predetermined time may be elapsed when the object moving within each of the conduit(s) may be affected by selected ones of the damaging elements.

BRIEF DESCRIPTION OF THE DRAWINGS

FIG. 2 is a representative graph showing the manner in which the player's tension may mount over the course of a multi-act electronic game, according to the present invention.

FIG. 3 shows three illustrative examples of the thematic structure of three multi-act electronic games, according to further embodiments of the present invention.

FIG. 6 shows two further embodiments of the present invention, in which the sections are pipes or roadway sections.

FIG. 11 illustrates further aspects of an electronic game according to an embodiment of the present invention.

FIG. 13B shows further aspects of the Mystery Snag Palette of Betting Opportunities, according to an embodiment of the present invention.

DETAILED DESCRIPTION

Embodiments of the present invention include methods for providing casinos with a multi-act class of electronic games that is based on simple storyboards that are readily accessible to the younger generation of players. This new class of electronic games may be configured to leverage recent home video games and popular culture and may tic in familiar games such as, for example, "SimCity®" and "The Sims®" or utilize familiar TV characters such as the cast of "Friends" or familiar film themes such as the "Lord of the Rings" or "Star Wars®." Multi-act storyboarded electronic casino videogames that combine captivating animations, rich selection criteria, rising tension, conflicts, "Mystery Snags" and multi-line play with dynamic decision-making opportunities and never before offered betting options will produce an entirely new and unrivaled gaming experience.

Figure 1:
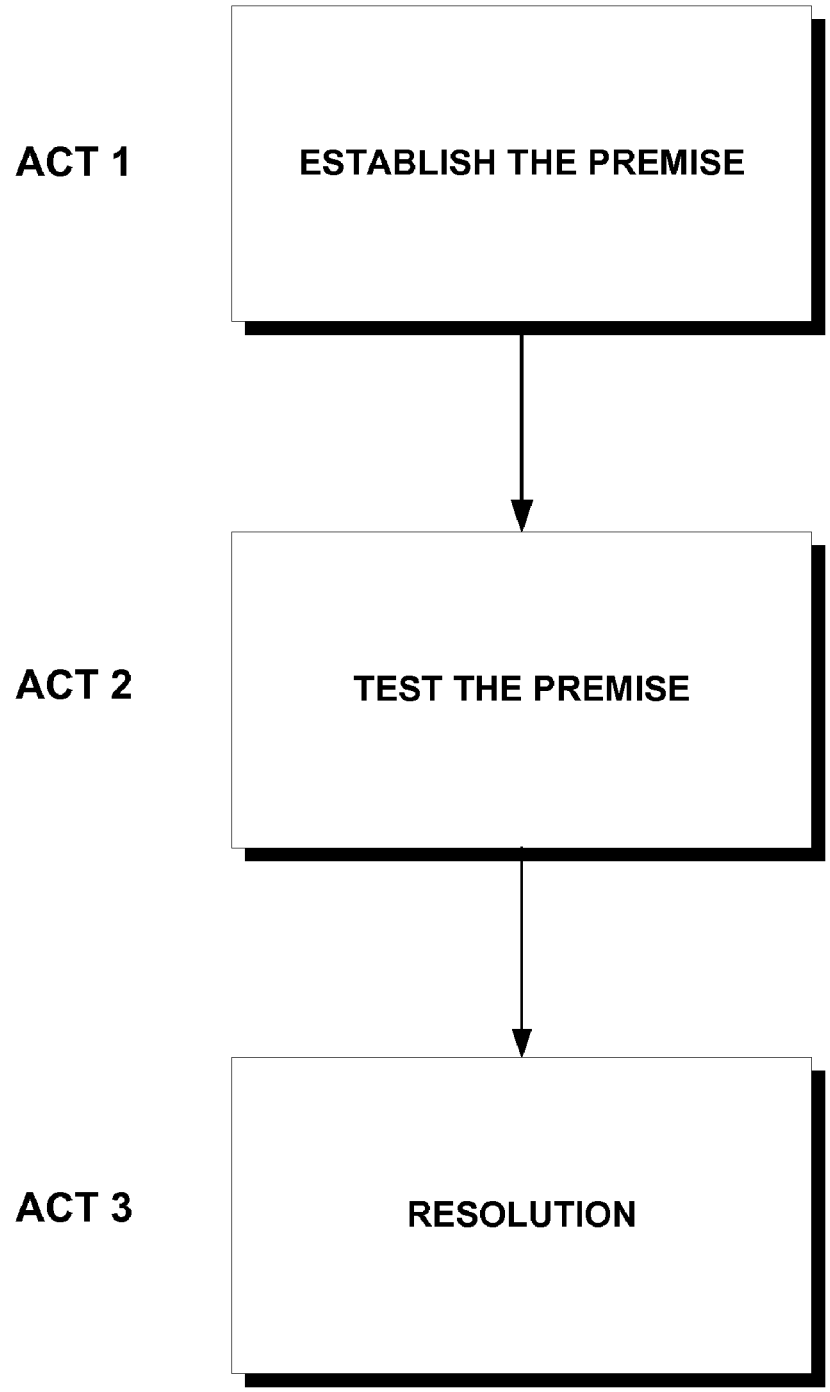
FIG. 1 is a block diagram of a storyboard of a three-act game for a gaming machine, according to an embodiment of the present invention

As shown in FIG. 1, a three-act scenario or storyboard that may be implemented in an electronic multi-act electronic game according to an embodiment of the present invention may include a first act to establish the premise of the multi act electronic game, a second act to test the established premise (by introducing a difficulty, conflict or snag, for example) and a third act that may result in a complete or partial resolution of the difficulty, conflict or snag introduced in the second act. Variations may occur to those of skill in this art, FIG. 1 being presented for exemplary and non-limiting purposes only. The multi-act electronic game according to embodiments of the present invention may seek to engage the player, such that the player develops a vested interest in the premise, in the snags or difficulties that occur and the resolution thereof. Indeed, the present multi-act electronic games may seek to increase or otherwise manipulate the player's tension, alertness or emotions during the course of a game. As shown in FIG. 2, each act of electronics games according to embodiments of the present invention may build on the preceding act, and the player's tension may build or ebb according to the flow of the story presented. As shown in FIG. 2, the tension may build slowly over time at the beginning of the game, and grow non-linearly as the game unfolds and snags are encountered. The tension may be at least partially released toward the end of the game.

FIG. 3 shows three illustrative examples of the thematic structure of three multi-act electronic games, according to further embodiments of the present invention. Each act within a multi-act game is preferably associated with an act sequence number. As shown, an electronic game 302 may be structured as a three-act game, including a first construction act 304, a second act 306 in which the constructed item (e.g., road, vehicle, bridge) is tested and subjected to snags (e.g., extreme weather, earthquakes, attacks), and a third act in which the testing and snags are resolved, as shown at 308. Similarly, the storyboard of another electronic game 310 may call for the creation of an itinerary of a journey as shown at 312, a second act in which the player, the player's avatar or other character travels the established itinerary and encounters difficulties or snags along the way as shown at 314, and resolution (e.g., reaching or failing to reach the destination, reaching or failing to reach the object of the quest), as shown at 316. Those of skill in this art may recognize that many other multi-act themes may be implemented. Such themes may be taken from myths, literature, popular culture, scientific journeys of discovery, to name but a few possibilities. For example, the storyboard of a third electronic game 318 according to an embodiment of the present invention may call for the establishment of a relationship (between the player and a character, between two or more characters, between players on different gaming machines playing the same game, etc.) as shown at 320, a testing of the established relationship (e.g., a player or character gets injured, falls in love and/or betrays the player or another character) as shown at 322, and the resolution of the conflict or test, as shown at 324.

Embodiments of the present method may also be structured around two acts or around more than three acts. For example, an electronic game according to an embodiment of the present invention may be configured or "staged" as a two-act scenario, including (a) selecting "acting" players (actual or computer generated) for a Poker game and (b) playing the Poker game. Betting opportunities may include (without limitation) which players will be chosen, the character and gaming style of each player, which player will win, which player will be the first to lose, how long will the game last and how much will the winner gross, to name but a few possibilities. A typical four-act scenario for a game may be: (a) Establish the premise; (b) Unfold the premise, (c) Complicate the premise, and (d) Resolution of the premise. Alternatively, "acting objects" may be selected for staging an act wherein the objects may be configured and used in the performance of the act; a car and a bicycle may be examples of acting objects.

It is to be noted that embodiments of the present invention are not limited to two, three or four-act electronic games. Potentially, games having a greater number of acts may be implemented. For example, the electronic game may have 10, 20, 200 or an unlimited open-ended number of acts, each of which may be associated with an act sequence number. Indeed, the game play may be configured so as to enable players to evolve the game and influence the manner in which it unfolds, thereby keeping the game play new and fresh. Contextual game information may be periodically saved, so as to enable the player to interrupt game play and to resume game play and the same story line at some latter time. Such contextual information may be saved on a central server, one or multiple gaming machines coupled in a peer-to-peer network, stored on a player loyalty card or any combination of these. If the storyboard is sufficiently complex and the game play sufficiently engaging, it is believed that players may become attached to the characters and develop a vested interest in the eventual outcome of the story presented.

Figure 4:
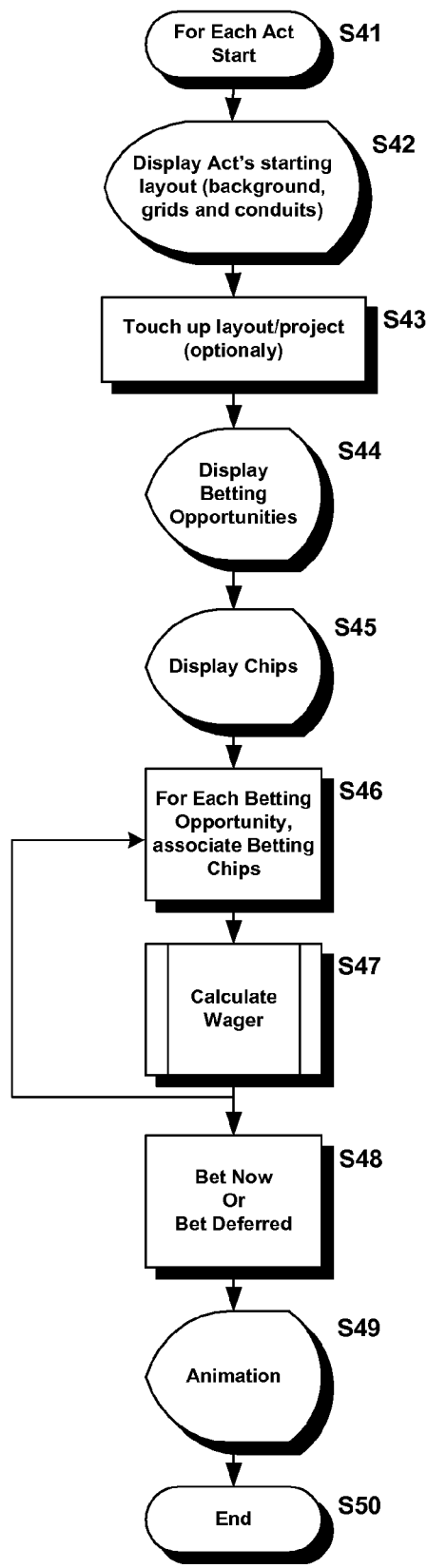
FIG. 4 is a flowchart of a baseline flow within one act of a multi-act electronic game, according to an embodiment of the present invention.

FIG. 4 is a flowchart of a baseline flow of steps that may be carried out within a single act of a multi-act electronic game, according to an embodiment of the present invention. For each act, as shown at S41, the current act's starting layout or stage may be displayed. As called for by S42, the starting layout may include background graphics, grids (such as a Game Play Grid described hereunder), conduits, scenery or whatever environment is consistent with the storyboarded script for the current act. The starting layout of step S42 may be the layout of the previous act. In cases wherein game play occurs on or within a grid, the grid may be two dimensional, three dimensional, regular, irregular and/or composed of insular regions, for example. As called for by step S43, the player may then optionally be given an opportunity to alter layout according to his or her preferences, using onscreen commands. In step S43 and/or step S44, one or more Palettes of Betting Opportunities may be displayed, each of which may offer a category of features on which the player may place bets. The features may be selected in accordance with the current staging context of the act, that is, are relevant to the story, actors and staging of the act being displayed. Such categories of features may include, for example, persons, characters, events, construction parts, sources and destinations, to name but a few possibilities. As used herein, the phrase "Palette of Betting Opportunities" (or wagering opportunities) refers to a range of available categories or items on which the player may place one or more bets. In step S44, Betting Opportunities Icons may be displayed to the user. Each of the Betting Opportunities Icon, when selected, may cause a corresponding Palette of Betting Opportunities to be displayed for the user. Each Betting Opportunity Icon, therefore, may be associated with a Palette of Betting Opportunities. Such Palette of Betting Opportunities may be displayed, for example, within a pop-up window or within a roll-out pane—or by other means through a suitable user interface, As called for by step 845, a graphical representation of the available bets may be displayed, depending upon the Betting Opportunities Icon selected by the player. The available bets may be graphically represented as one or more Chip Palette Icons. When the player selects one of the Chip Palette Icons, a Palette of Chips may be displayed. A Palette of Chips, according to an embodiment of the present invention, may include a graphical representation of available bets which, when selected, allow the player to interactively place one or a plurality of selected chips onto a betting opportunity. The Palette of Chips may also be displayed via, for example, a pop-up window or a roll-out pane, for example.

Therefore, one or more Betting Opportunities Icons may be displayed on the layout for each act and in accordance with the current staging context, and each of the Betting Opportunities Icons may, when selected by the player, cause the display of a selected Palette of Betting Opportunities. When the player selects one of the betting opportunities from the Palette of Betting Opportunities, one or more Chip Palette Icons may be displayed. When the user selects one of the Chip Palette Icons, a Palette of Chips may be displayed, enabling the user to place one or more of the displayed chips onto a selected betting opportunity. Alternatively, the Betting Opportunities Icons and the Chip Palette Icons may be dispensed with, and the Palette of Betting Opportunities and the Palette of Chips displayed directly, without first displaying the Betting Opportunities Icons or Chip Palette Icons.

Betting chips representing the player's selected bet may then be associated with any betting opportunity selected by the user, as shown at S46. Thereafter, the wager (or stake) may be calculated based upon the chips associated with the betting opportunity and a predetermined formula and/or pay table, as suggested at S47. The method may revert to step S46, should the player wish to place additional bets on any other betting opportunities available within the displayed Palette of Betting Opportunities.

As shown at S48, players may have the option to watch his or her bets unfold one-by-one within each act, or may defer finding out whether the bets are winners or losers in order to watch the entire storyboard unfold before their eyes, with each placed bet resolving as the underlying story unfolds. That is, a player may be given the opportunity to place all bets in each act before any of the acts unfold and watch the results thereof like a movie, or to interactively place bets within individual acts and have the results of such bets revealed in a piecewise fashion, within each act. As the bets and the storyboard unfolds, rich animation, movie sequences, sounds and graphics may be rendered on the gaming machine's video display(s), with appropriate sound and video effects at strategic times during the action and as bets are won and lost. For example, as developed fully herein below, the premise of a storyboarded three act game may be to construct a pipe to enable a liquid to flow between a source and a destination. The animation of step S49, in that case, may include showing the liquid as it flows from the source to the destination. Some pipe sections may be shown to be initially spinning (thereby building tension and anticipation), and then shown to progressively slow down as the liquid approaches the spinning section. If the pipe section is the correct section and if the pipe section is oriented correctly, the spinning may stop to allow the liquid to flow therethrough (thereby releasing player tension). If the spinning pipe section was the subject of a betting opportunity and if the player placed a bet that the spinning pipe section was indeed the correct pipe section and was oriented correctly, the player may be rewarded with a payout, according to the pay table for this betting opportunity and the amount wagered. To add complexity, the pipe section may indeed be the correct one and be correctly oriented, yet turn out to be rusted out and leaking. This would, in turn, lower any payout, again according to the predetermined pay table for that betting opportunity and the amount wagered. The quality of the pipe section may be a factor in the associated displayed representation of an outcome amount (i.e. lower quality parts equate to a lower outcome amount). Examples of quality factors are a leaky part, a corroded part, an undersize part, a partly obstructed part, an inferior quality part, a non genuine part, a faulty part and a damaged part.

Figure 5:
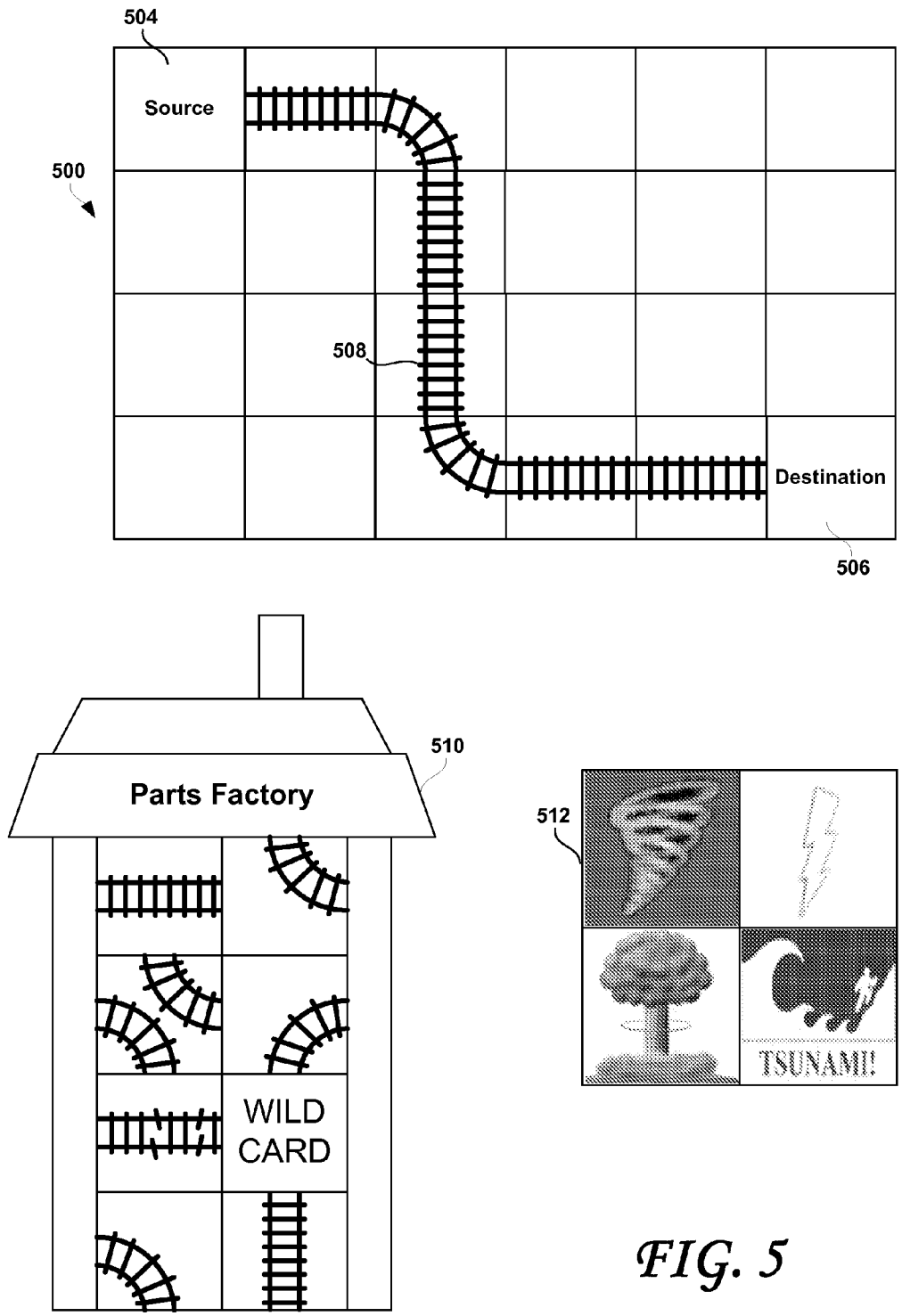
FIG. 5 shows an exemplary layout of an electronic multi-act game, according to an embodiment of the present invention.

FIG. 5 shows an exemplary layout 500 of an electronic multi-act game, according to an embodiment of the present invention. The layout 500 may also be referred to as a stage on which one or more of the acts of the present electronic multi-act game may unfold according to a storyline. Different acts may unfold on different stages or layouts 500. The layout 500 may include a plurality of grid sections that collectively may be referred to as a Game Play Grid. The grid sections need not be rectangular, need not be regular and need not be contiguous. According to an embodiment of the present invention, bets may be placed on selected constituent grid sections of the Game Play grid. In the example to be developed below, the storyboard includes one or more acts related to getting from a starting point 504 or source, to a destination 506. In the illustrative example of FIG. 5, a railroad is shown across the grid sections of the Game Play Grid 500. A Palette of Betting Opportunities 510 may also be provided, which Palette of Betting Opportunities may include graphical representations, in this example, of a number of railroad sections and optionally, one or more "Wild Card" sections. This Palette of Betting Opportunities 510 (called the "Parts Factory" in FIG. 5) may include a range of railroad sections (in this example). As shown in FIG. 5, one of the goals of this embodiment of the present electronic game may be to connect a source 504 to a destination 506, using the railroad sections shown in the Palette of Betting Opportunities. The player may build up a predicted railroad path from the source 504 to the destination 506 by moving selected railroad sections, section by section, from the Palette of Betting Opportunities 510 to the Game play Grid 500. The player may select a bet from a Palette of Chips for each or selected railroad sections moved from the Palette of Betting Opportunities to the Game Play Grid 500, representing the player's wager that the actual railroad section to be generated by the electronic game will match the predicted railroad section moved by the player from the Palette of Betting Opportunities 510 to the Game Play Gird 500. When the player has finished placing his or her bet(s), the player may press a "Bet" button (for example), whereupon the electronic game may generate the actual patch of the railroad from the source 504 to the destination 506. Each time a predicted railroad section matches the actual railroad section generated by the electronic game, the player may be rewarded according to his or her bet placed on that section and a predetermined pay table. Alternatively, the player may be rewarded only if the actual railroad matches the predicted railroad in its entirety. The Palette of Betting Opportunities may include acting objects that may be selected for inclusion into an act being prepared (or staged). Acting objects may be removed or their attributes may be modified. Examples of attributes for a "person" acting object include, for example, hair color, eye color and the character. Examples of attributes for a "car" acting object include, for example, the model of the car and the color of the paint.

Embodiments of the present invention may include more than one Palette of Betting Opportunities, as shown at 512. This Palette of Betting Opportunities may be called "Mystery Snags." "Mystery Snags", according to embodiments of the present invention, may include an event that may damage, destroy or weaken a previously constructed and tested project. For example, during a liquid flow animation, a blizzard snag with very low temperatures may be seen approaching the pipes, thus building tension and mystery as to whether the pipes will freeze and burst. Betting on clogged or busted pipes may be enabled through an offering of a further Palette of Betting Opportunities.

The player may select one or more of the Mystery snags 512 and place them on the Game Play Grid 500 and select a bet thereon from a Palette of Chips. For example, the player may place a bet (e.g., $1, $5 or $10) that one of the Mystery Snags will appear on the fourth railroad section 508. As shown in FIGS. 5 and 13, the Palette of Betting Opportunities 512 may include, for example, a number of natural or man made calamities such as tornadoes, lightning, a bomb or a tsunami. These Mystery Snags are only shown for exemplary purposes, as their nature is only limited by the imagination of the game developer. A third act may allow a player to bet on whether the railroad section survived the Mystery Snag, for example.

FIG. 6 shows two further embodiments of the present invention, in which the sections are not railroad sections as in FIG. 5, but pipes (602) or roadway sections (604). One of the goals of these embodiments may include successfully carrying a liquid within the built up pipe from the source to the destination as shown at 602 or enabling a vehicle to successfully follow the built up road from the source to the destination, as shown at 604. More than one path may be present on the Game Play Grid, as shown in Game Play Grid 604, in which the player may build up two paths; one from source A to destination A and another from source B to destination B. Such construction-based projects may take many forms, including but not limited to: roads, wiring, pipes, labyrinths, train tracks, rivers, fiuel lines, ignition cords and corridors. In other types of storyboards, projects may take on more abstract embodiments such as quests or emotional journeys. The Mystery Snags may vary according to the form of the project. For example, one of the Mystery Snags for a wiring project may include a rat gnawing through a wire section or, for a river, beavers damming up a section, preventing the water to flow therethrough.

As shown in the Game Play Grid 604 and according to a further embodiment of the present invention, the present electronic game may also generate an incomplete path from the source(s) to the destination(s) in a first act and the user may then place bets on which section will next be generated to complete the roadway (in this example) from the source to the destination during a second act. For example, the player may bet that grid square 608 will change to a section that completes the roadway. Alternatively, the player may place a bet on grid square 606, betting that the straight roadway section currently appearing therein will change to a curved roadway section and join up with the roadway section appearing in grid square 610.

Figure 7:
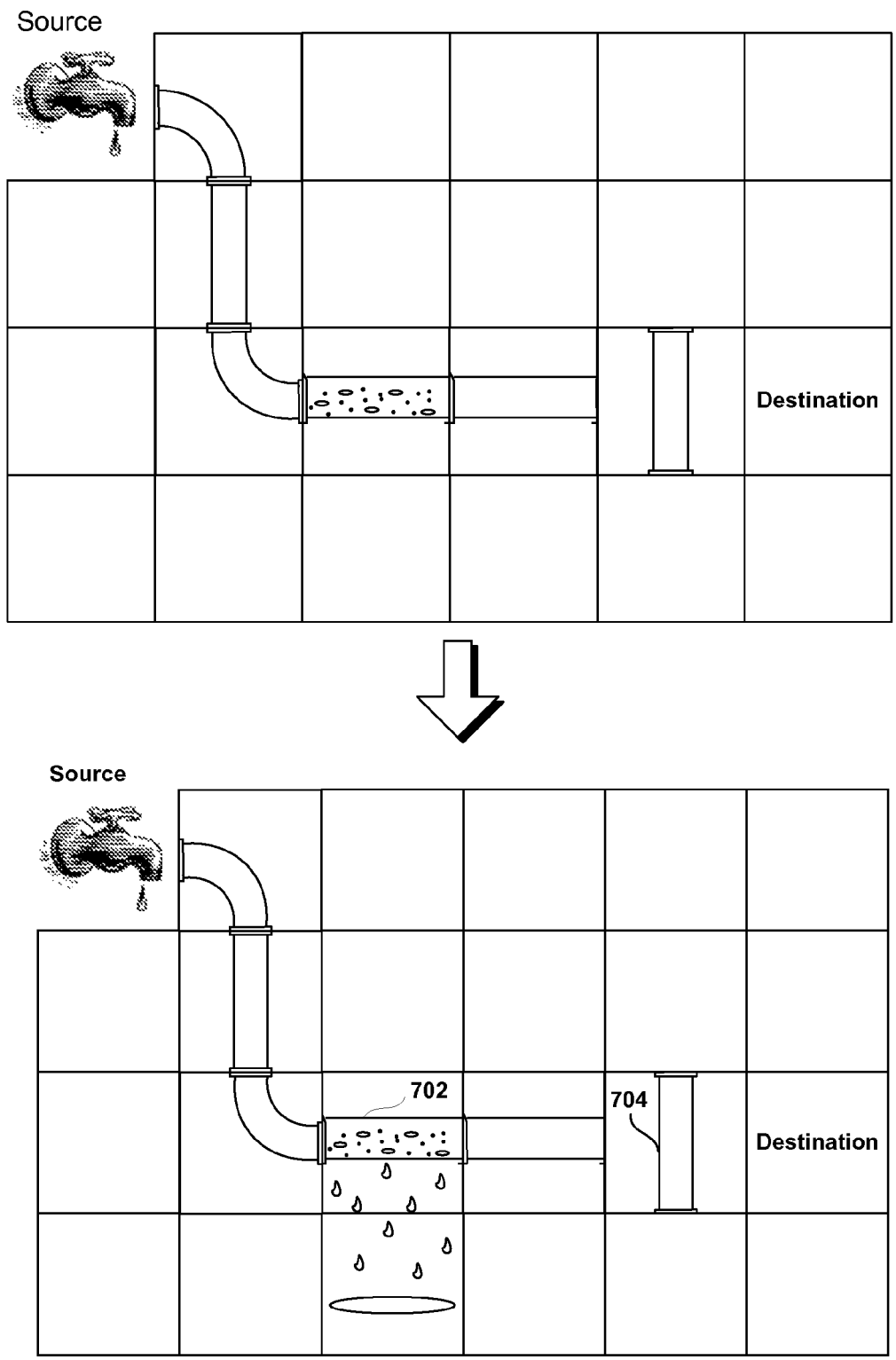
FIG. 7 shows further aspects of another embodiment of the present invention.

FIG. 7 shows further aspects of another embodiment of the present invention. As shown therein, after a construction first act in which the pipeline is constructed, the player may experience a second act, in which the constructed pipeline may be tested. For example, as shown in FIG. 7, water may be caused to flow through the constructed pipe. Some of the game's source to destination combinations may include (but are not limited to), for example, syrup to a lumberjack's pancakes (red-brown liquid), squid ink to a pen factory (purple liquid), a beer keg to a thirsty Viking's mouth (golden liquid), gasoline to a race car's fuel tank (golden liquid), fountain of youth water to an aging explorer's mouth (crystal blue liquid), intergalactic medicine to an alien hospital (glowing green liquid), etc. Players may be awarded greater rewards for completing pipelines that carry more rare/valuable/flammable liquids. The game's pipe sections may include (but are not limited to), for example, I-shapes, horizontal I's, crosses, loops, and elbow-macaroni shapes in multiple orientations. As shown in the lower drawing of FIG. 7, when the water (or other source material) flows through a faulty pipe section as shown at 702, leakage (inefficient transportation) of the liquid may occur. Players may be awarded smaller rewards for such inefficient transport. As shown at 704, when the water or other source material reaches a missing or incorrectly aligned section, it will not pass through to its destination, and the player may not be rewarded.

Figure 8:
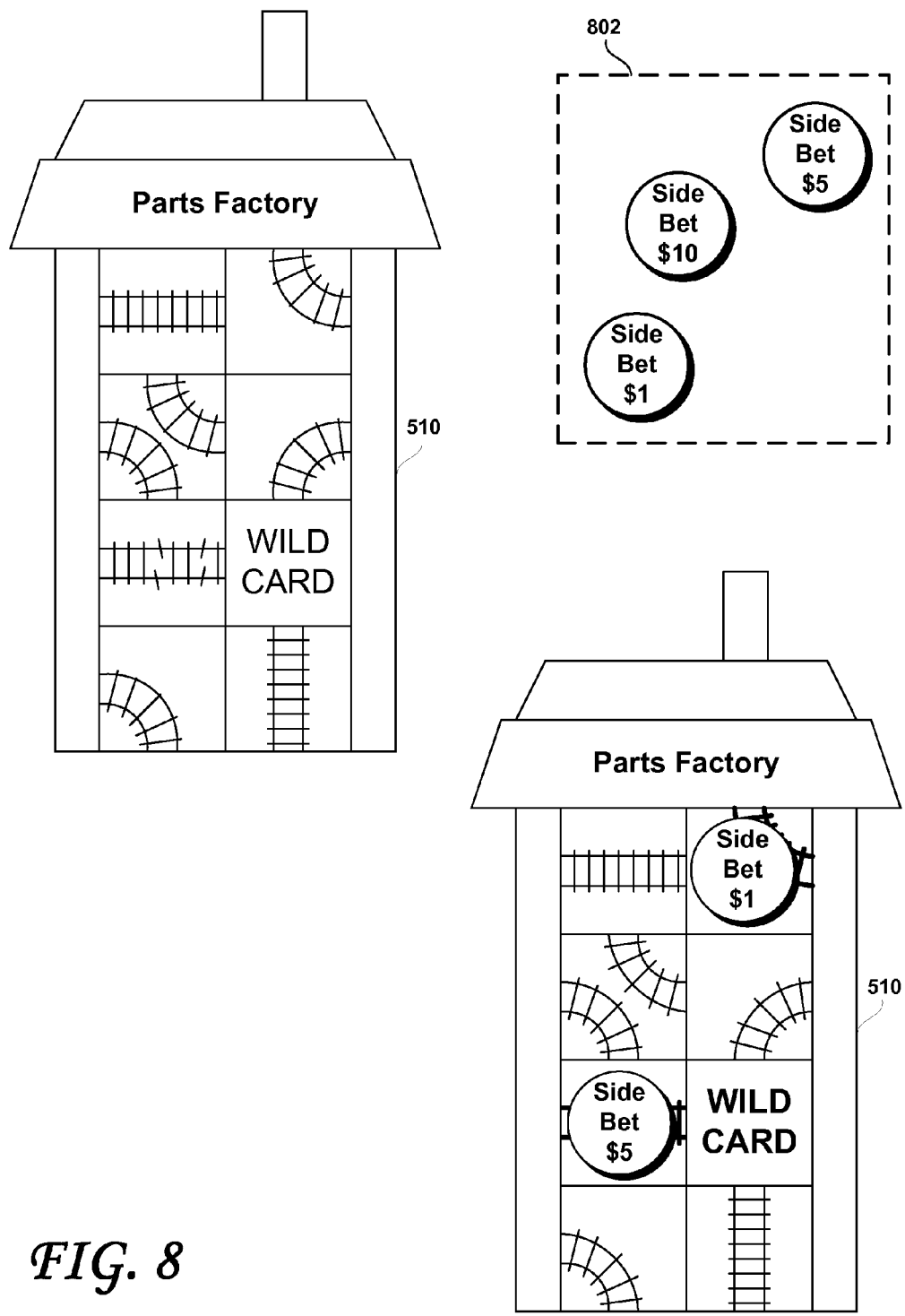
FIG. 8 shows further aspects of an electronic game according to embodiment of the present invention.

FIG. 8 shows further aspects of an embodiment of the present invention. As shown, the player may place bets on which of the sections in the Palette of Betting Opportunities 510 will appear next in the Game Play Grid. To do so, the player may select one or more chips from a Palette of Chips 802 and place the selected chip or chips onto selected one or ones of the sections of the Palette of Betting Opportunities 510.

Figure 9:
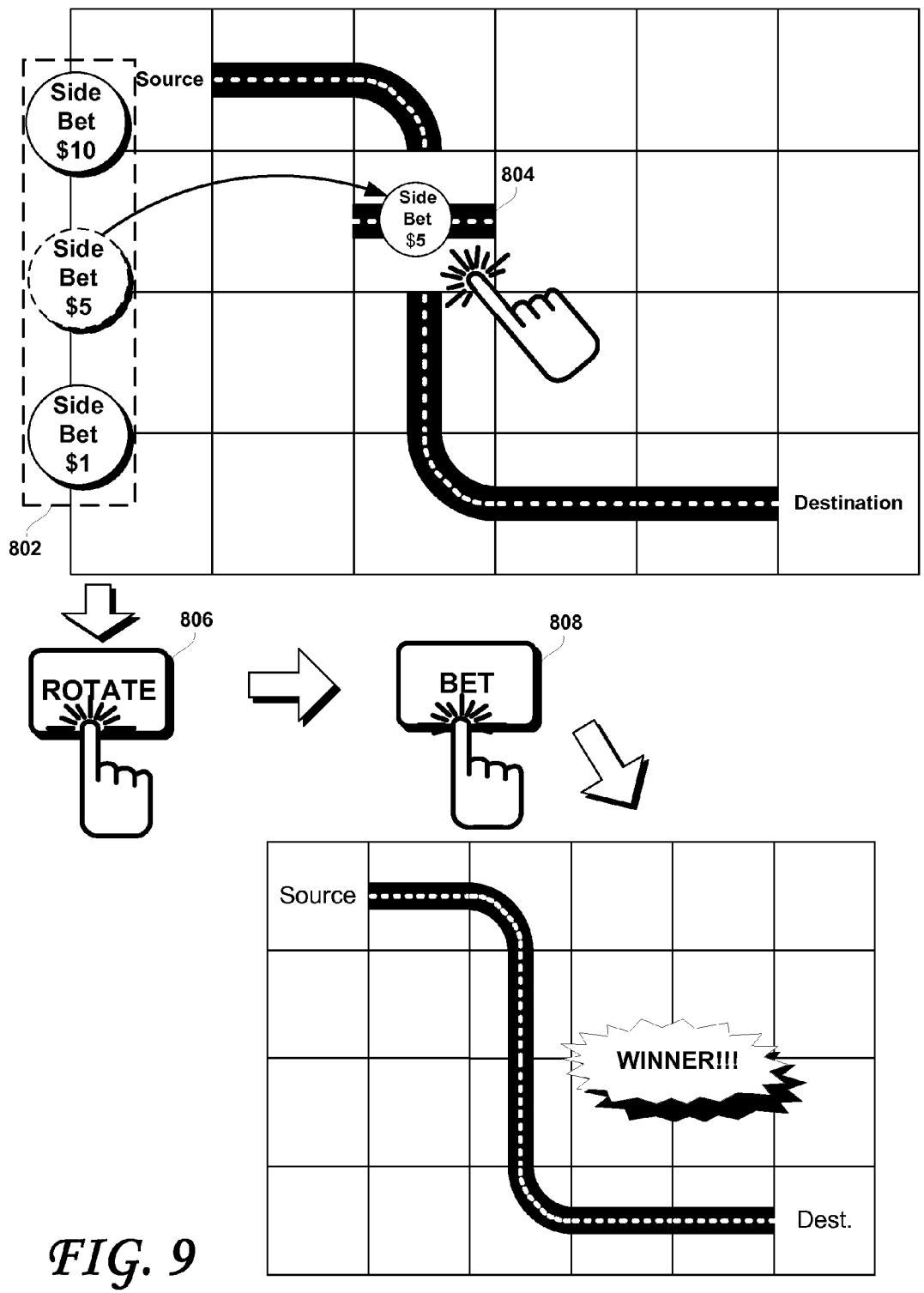
FIG. 9 shows still further aspects of an electronic game according to embodiment according to the present invention.

FIG. 9 shows further aspects of an embodiment according to the present invention. As shown, when a section of the generated roadway is misaligned, the player may be invited to place a bet on whether the next iteration and regeneration of the roadway will rotate the misaligned section 804. To do so, the player may press a Rotate button 806, which represents the Palette of Betting Opportunities for this section. In this case, the Palette of Betting Opportunities 806 only contains a single betting opportunity—namely, to rotate the section of roadway. After having selected the rotate betting opportunity, a Palette of Chips 802 for this betting opportunity may appear, enabling the player to bet, in this case, $1, $5 or $10 that section 804 will be rotated when the roadway is next regenerated by the electronic game. In FIG. 9, the player has selected a $5 bet, which may then be placed (e.g., dragged and dropped) onto the misaligned section 804, as shown. After the player has placed his or her bet, the Bet button 808 (or functional equivalent) may be pressed. If the next iteration and regeneration of the roadway rotates misaligned section 804, the roadway is complete and the player wins, and may be rewarded according to the predetermined pay table and his or her $5 bet. Various animations, graphics and/or sound effects may further add to the reward and heighten the gaming experience. For example, the misaligned roadway on which the bet was placed may be caused to blink until the roadway is regenerated.

Figure 10:
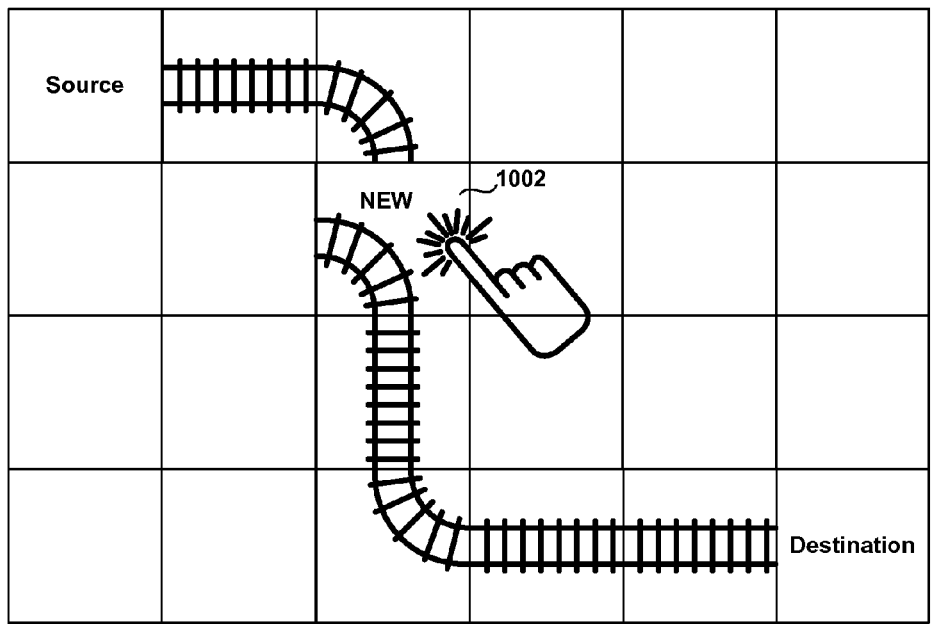
FIG. 10 shows an example of a "New Part" betting opportunity, according to an embodiment of the present invention.
Figure 10:
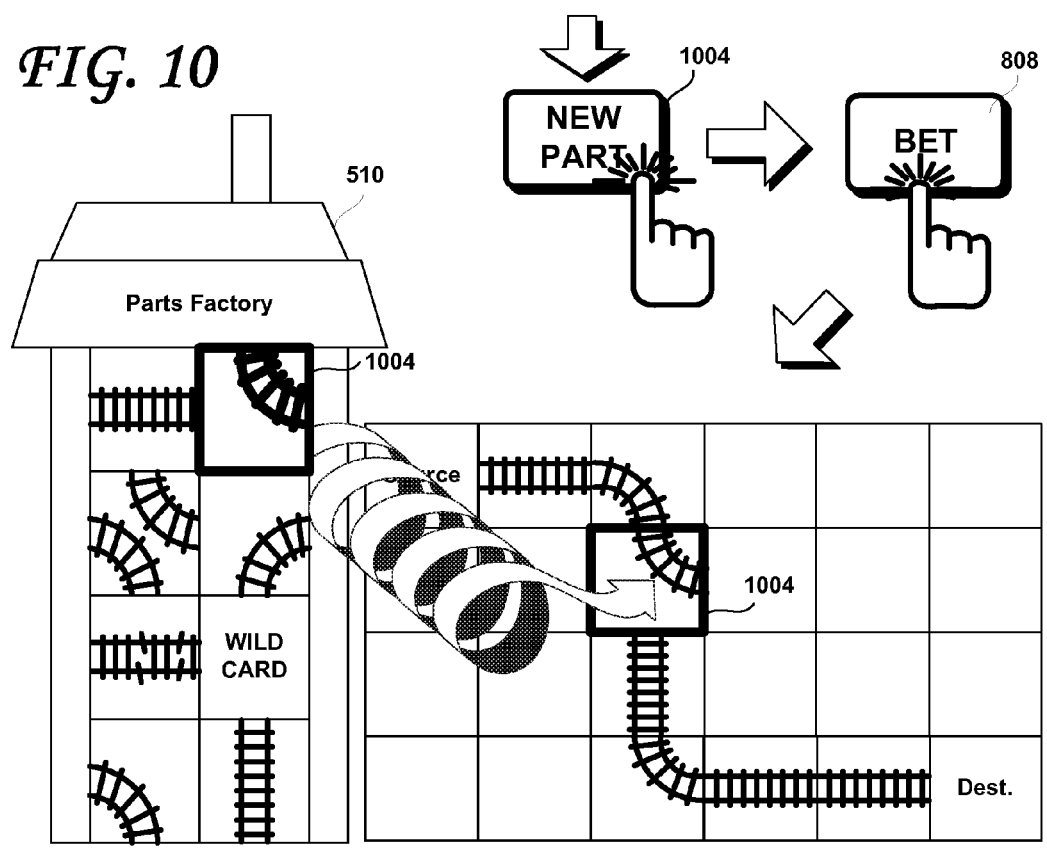

FIG. 10 shows an example of a "New Part" betting opportunity, according to an embodiment of the present invention. As shown, when a section of the generated railway is misaligned as shown at 1002, the player may be invited to bet whether a new part will be the correct section of railway to complete the railway from the source to the destination. To do so, the player may press a New Part button 1004 (or some functional equivalent in the user interface), which may form part of the Palette of Betting Opportunities for this section. Note that the Rotate betting Opportunity as shown in FIG. 9 may also have been selected by the player. In that case, the Palette of Betting Opportunities may contain two betting opportunities; namely, the Rotate betting opportunity and the New Part betting opportunity. After having selected the New Part betting opportunity, a Palette of Chips 802 (see FIG. 9) for this betting opportunity may appear, enabling the player to bet that section 1004 will be replaced with a new part that will complete the railway—in this case, a straight section of track. After the player has placed his or her bet, the Bet button 808 (or functional equivalent) may be pressed. The electronic game may then trigger an animation sequence during which a random Number Generator (RNG) may be used to randomly select a new part from among the Palette of Betting Opportunities 510 and to place the selected new part 1004 into the Game play Grid at the position previously occupied by misaligned section 1002. As shown, the selected section does not successfully complete the railway and the player may lose his or her bet.

FIG. 11 illustrates further aspects of an electronic game according to an embodiment of the present invention. As shown, players may place a single bet on a single project (e.g., construction of a railway, roadway, pipeline, etc.), as shown in the top drawing of FIG. 11 or may place multiple bets on multiple projects that may appear within the Game Play Grid, as shown in the bottom drawing of FIG. 11.

Figure 12:
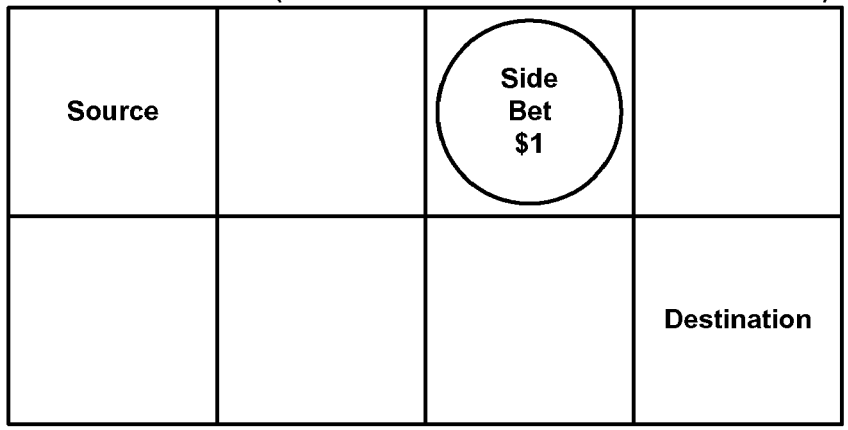
FIG. 12 illustration placing side bets, according to an embodiment of the present invention.
Figure 12:
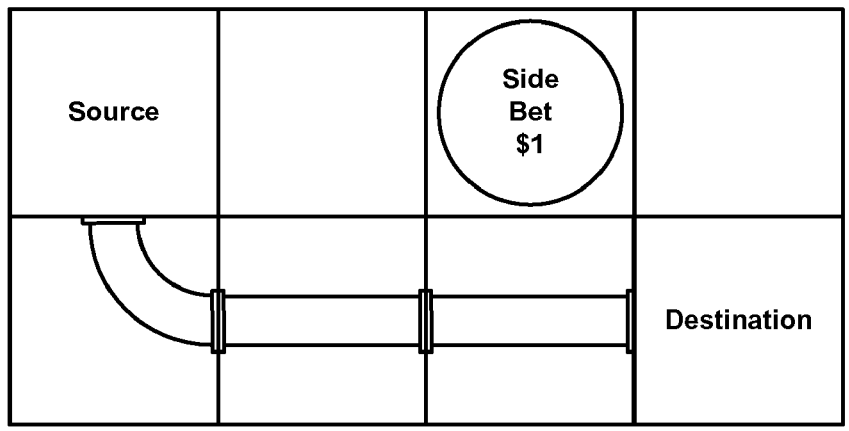
Figure 12:
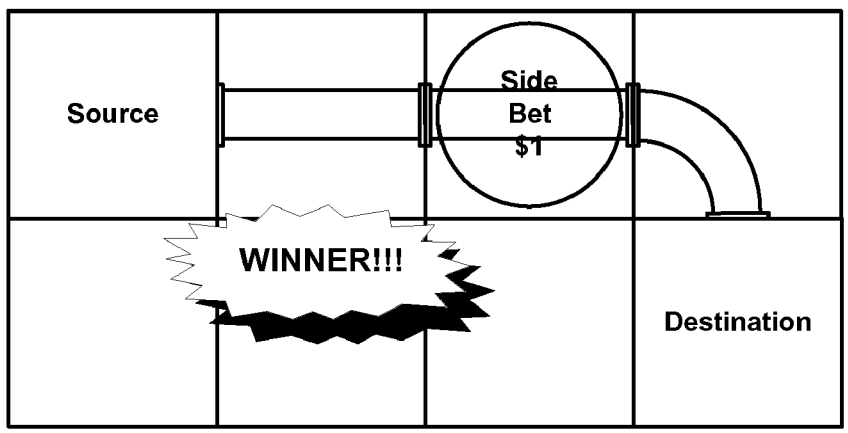

FIG. 12 illustration placing side bets, according to an embodiment of the present invention. As shown, before the first act (that is, before a project is constructed, for example), the player may place one or more side bets. In the exemplary embodiment of FIG. 12, the storyboard of this multi-act electronic game calls for the construction of a pipeline. The player, according to a further embodiment of the present invention, may place on or more side bets to predict where one or more sections of the pipeline to be constructed will be laid. In the top drawing of FIG. 12, the player has placed a $1 bet that the yet-to-be-constructed pipeline will go through the grid square where the player has placed his or her bet. The middle drawing in FIG. 12 shows an instance in which the constructed pipeline fails to pass through the grid square on which the player bet, whereas the bottom drawing of FIG. 12 shows an instance where the constructed pipeline does indeed pass through the player predicted grid square. The electronic game may then reward the winning player, according to the wager placed and a predetermined pay table.

Figure 13A:
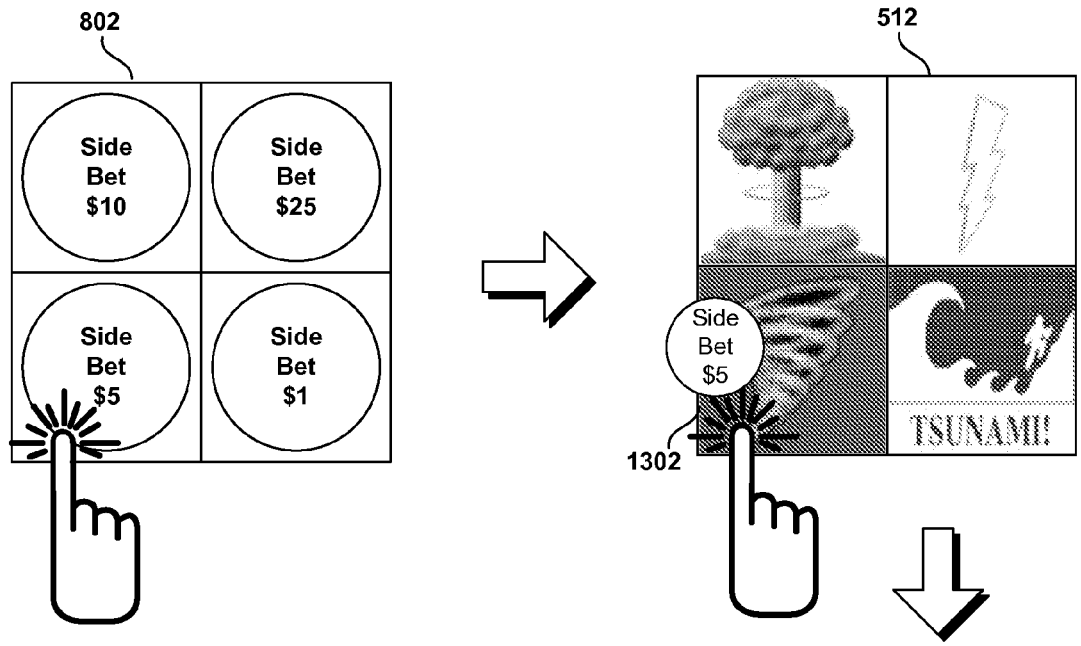
FIG. 13A illustrates the Mystery Snag Palette of Betting Opportunities, according to an embodiment of the invention.
Figure 13A:
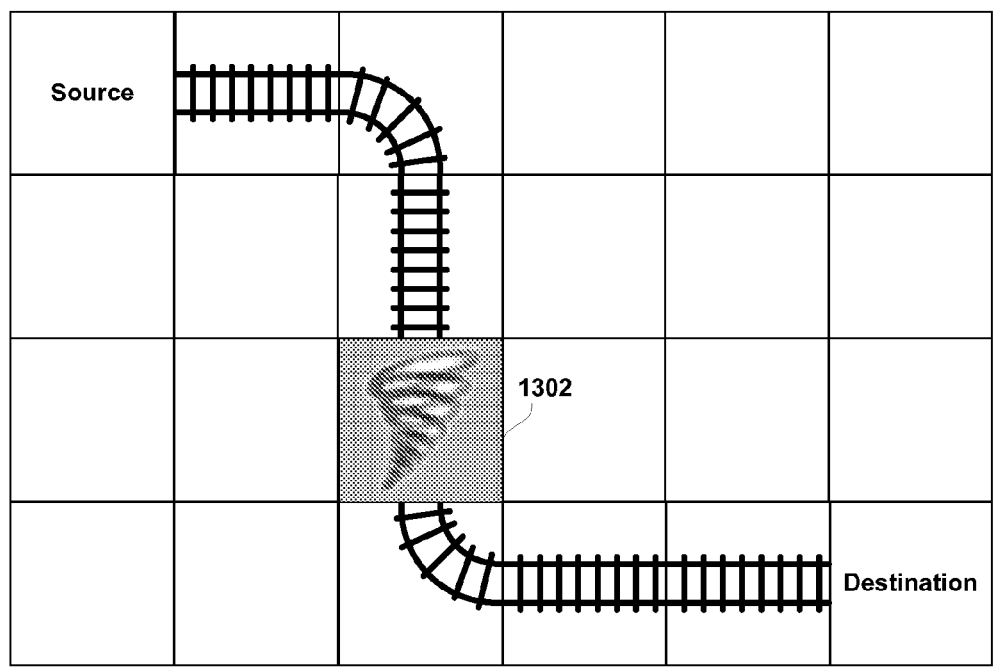

FIG. 13A illustrates aspects of the Mystery Snag Palette of Betting Opportunities, according to an embodiment of the invention. As shown, the player may be given the opportunity to place a bet (i.e., select a chip representing the desired bet from a Palette of Chips 802) on one of the Mystery Snags Palette of Betting Opportunities shown at 512. In the example shown in FIG. 13A, the user has selected a chip representing a $5 bet and selected a tornado 1302 from the Palette of Betting Opportunities 512 and placed the tornado on one of the railway sections. If a tornado is randomly selected and randomly touches down on the player selected section of the railway in the Game Play Grid, the user may be rewarded according to the wager placed (in this case, $5) and the predetermined pay table. FIG. 13B shows further aspects of the Mystery Snag Palette of Betting Opportunities, according to an embodiment of the present invention. As shown therein, other Mystery Snags such as a bomb or a faulty section of railroad track may appear and damage the construction project when it is generated by the electronic game. Players may not be awarded for projects that are ruined by such Mystery Snags.

Figure 14:
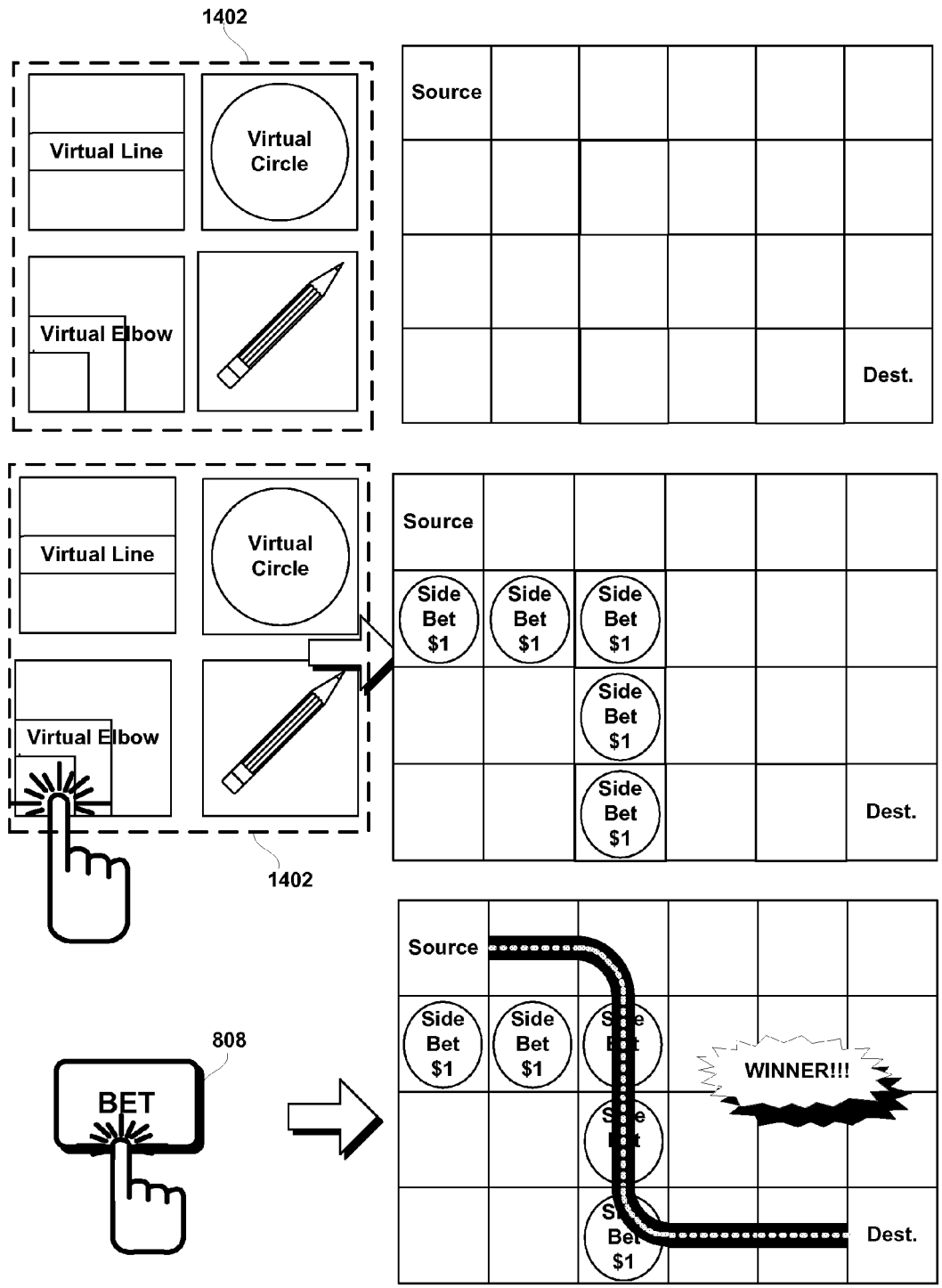
FIG. 14 shows another form of side bets, according to another embodiment of the present invention.

FIG. 14 shows another form of side bets, according to another embodiment of the present invention. Virtual Lines, according to another embodiment of the present invention, is form of side betting in which the user bets that a completed project (e.g., railway, pipeline, roadway, etc.) will pass through a variety of predicted paths, shapes and configurations on the Game Play Grid. As show, the player may be invited to place virtual lines, elbows and circles (for example) from a Virtual Lines Palette of Betting Opportunities 1402 on the Game Play Grid to build up, section by section, a predicted path of the project (in the example of FIG. 14, the construction of a roadway). Thereafter, the player may place bets (from a Palette of Chips—not shown in FIG. 14) on one or more section of the predicted path, as shown in the middle drawing of FIG. 14. Thereafter, the player may press the Bet button 808 (or execute some functionally similar action). A Random Number Generator may then be used to generate the actual roadway, as shown in the bottom drawing of FIG. 14. Where the actual electronic game generated roadway matches the predicted path of the roadway built up by the player, the player may be rewarded according to the amount of his or her wager and the predetermined pay table. In the bottom drawing of FIG. 14, the player's predicted path matched the actual path generated by the electronic game on three grid squares of the Game Play Grid. In this case, therefore, the player may be rewarded for having correctly predicted the actual path of the roadway for these three grid squares of the Game play Grid.

Figure 15:
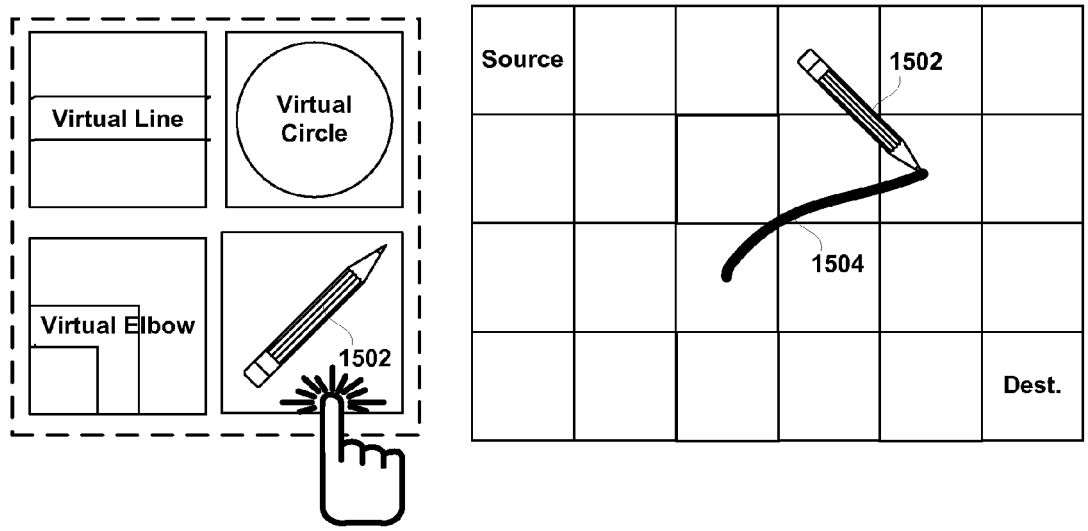
FIG. 15 shows another example of the Virtual Lines type of side bet, according to an embodiment of the present invention.
Figure 15:
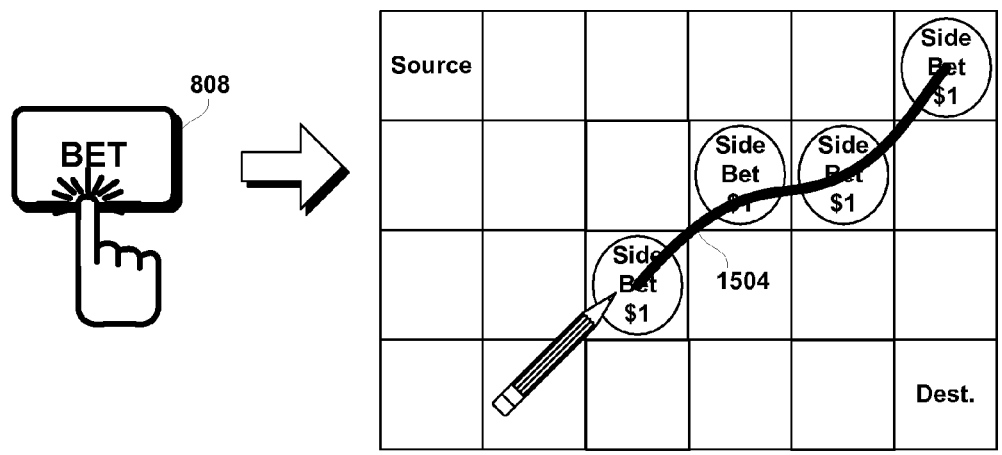

FIG. 15 shows another example of the Virtual Lines type of side bet, according to an embodiment of the present invention. The Virtual Lines Palette of Betting Opportunities may also include a Virtual Line Drawing Tool, as shown at reference 1502. Selecting the Virtual Line Drawing Tool 1502 enables the player to draw a virtual line 1504 on the Game Play Grid. The virtual line 1504 may then represent the player-predicted path of the construction (or other) project on the Game Play Grid, without the need to select individual virtual lines, elbows and circles to build up a predicted path. As shown in the right hand drawing of FIG. 15, the player may simply use the Virtual Line Drawing Tool 1502 to draw a virtual line 1504 on the Game Play Grid. Thereafter, the player may place bets on one or more of grid squares through which the virtual line 1504 passes, by selected chips corresponding to the desired wager from a Palette of Chips (not shown in FIG. 15). The end result is shown in the bottom drawing of FIG. 15, in which a plurality of $1 bets have been placed along the virtual line 1504. Should the electronic game generated project include sections that coincide with the player predicted sections, the player may be awarded according to the bet placed and the predetermined pay table.

Figure 16A:
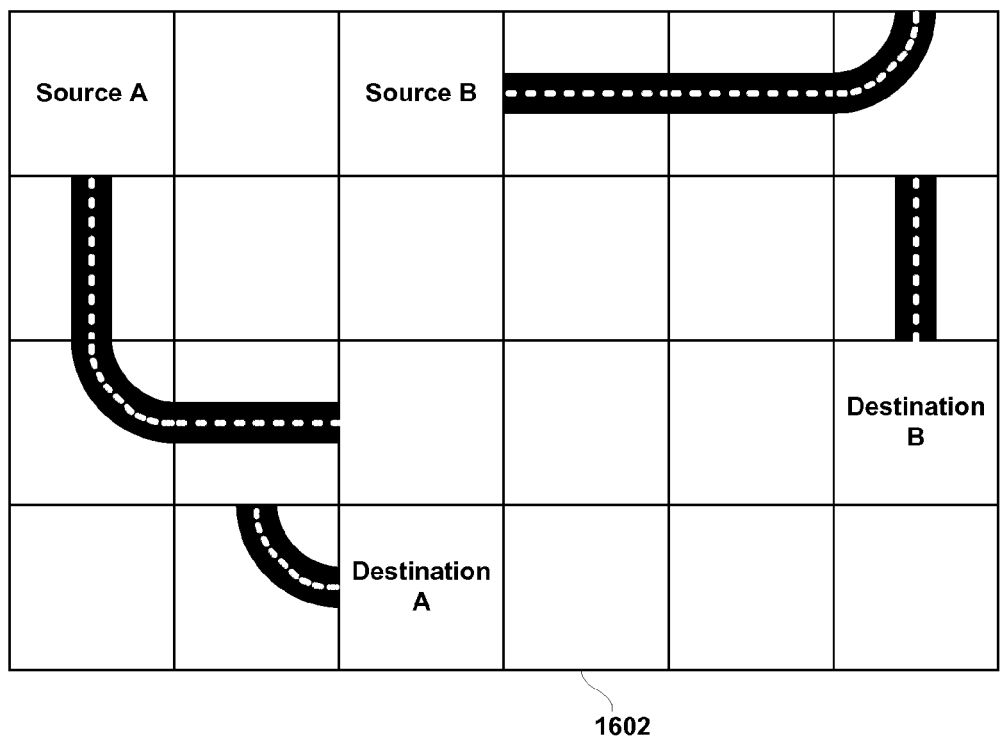
FIG. 16A shows further examples of Game Play Grids, according to further embodiments of the present invention.
Figure 16A:
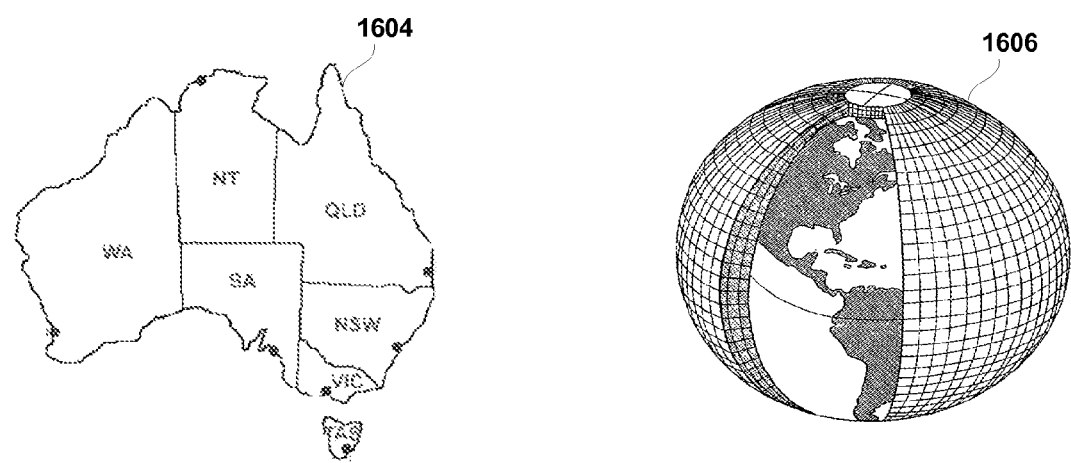
Figure 16B:
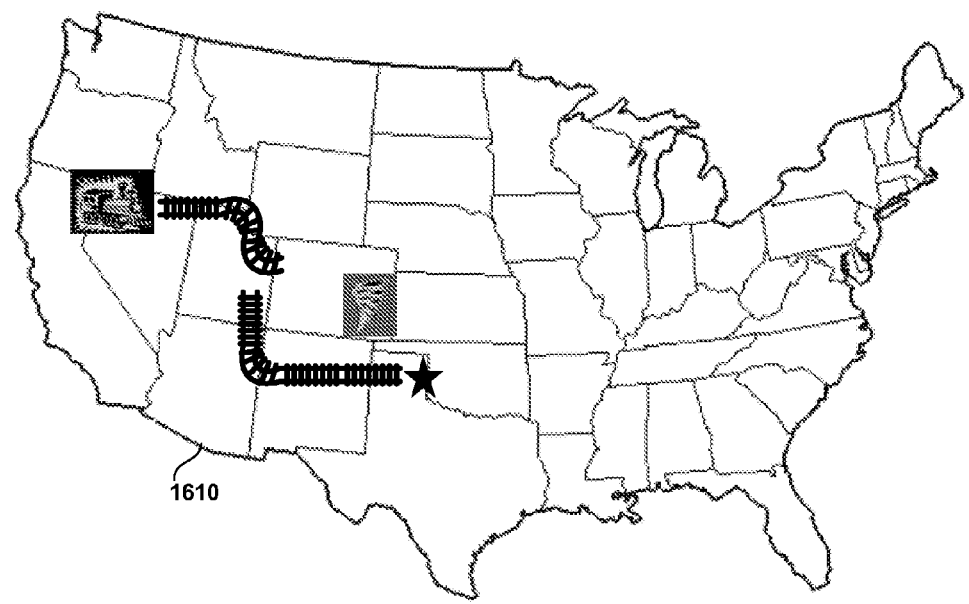
FIG. 16B shows additional examples of Game Play Grids, according to further embodiments of the present invention.
Figure 16B:
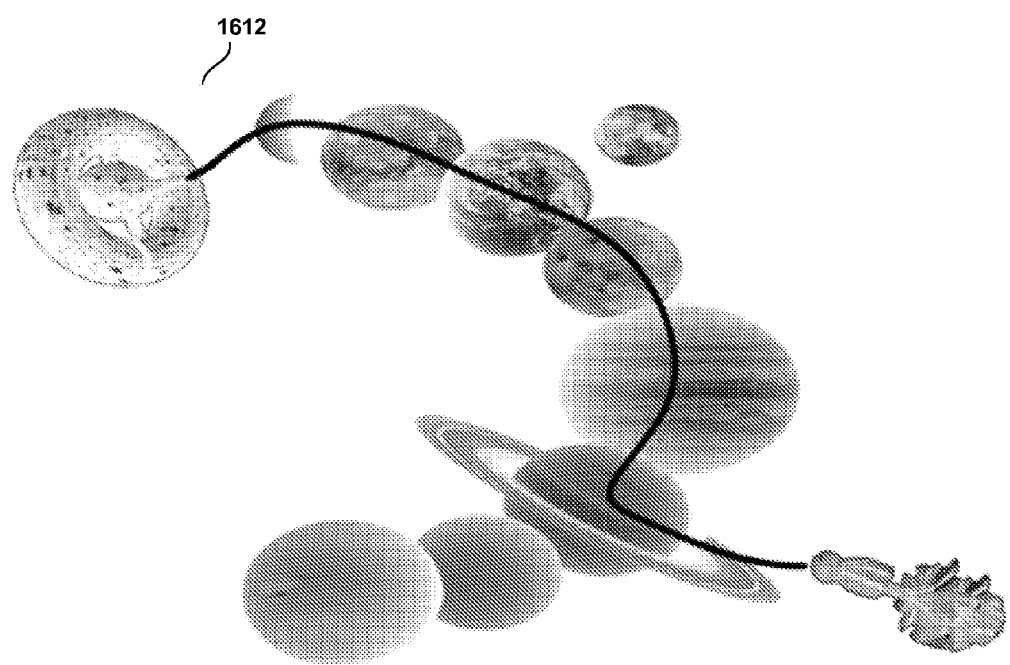
Figure 16C:
FIG. 16C shows still further examples of Game Play Grids, according to further embodiments of the present invention.
Figure 16D:
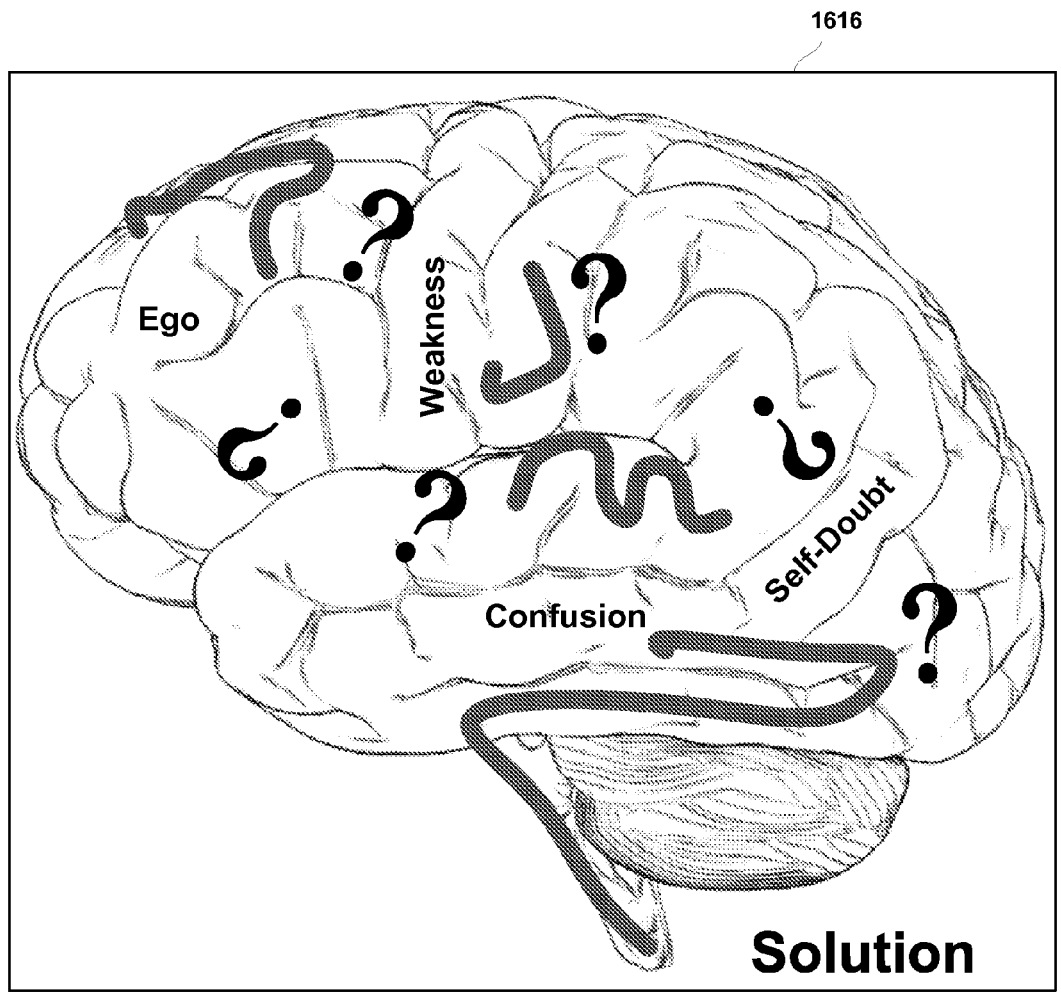
FIG. 16D shows additional examples of Game Play Grids, according to further embodiments of the present invention.

FIG. 16A shows additional examples of Game Play Grids, according to further embodiments of the present invention. As shown, a Game Play Grid may be two-dimensional and rectangular, with regularly spaced grid rectangles or squares, as shown at 1602. Alternatively, the Game Play Grid may be two-dimensional, but include irregularly-spaced and shaped grid sections, as shown at 1604. Alternatively still, the Game Play Grid may be three-dimensional and based on, for example, spherical coordinates, as shown at 1608. Game Play Grids and projects may include cultural references, such as the construction of railroad tracks across the American West for example as shown at 1610 in FIG. 16B. Alternatively still the Game Play Grid and projects may have a scientific, science fiction or fantasy bent, as is the case at 1612 in FIG. 16B, in which the project may include traveling to and/or communicating with a space station or alien outpost, for example. Alternatively still, the Game Play Grid and the projects carried out thereon may have historical significance or fanciful or mythical references, such as shown at 1614 in FIG. 16C. For example, projects may include mythical quests or the famous journeys of ancient works. Game Play Grids and projects may even represent journeys of the imagination or the mind, as shown at 1616 in FIG. 16D. Many other possibilities exist and may readily be implemented within the context of the present inventions. The Game Play Grid, therefore, is not to be limited by the examples shown and described herein.

Figure 17:
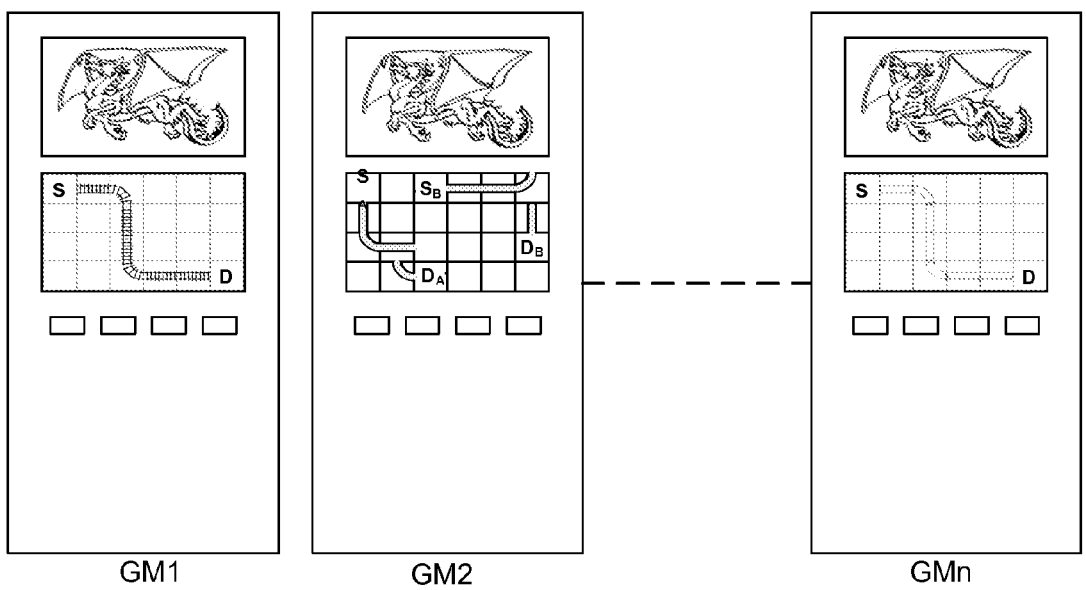
FIG. 17 shows several dual display gaming machines coupled to a network, to illustrate further aspects of embodiments of the present invention.

FIG. 17 shows several dual display gaming machines coupled to a network, to illustrate further aspects of embodiments of the present invention. When considering gaming machines having two displays, the top screen may display elements that illustrate or animate the act as it unfolds, while the bottom screen may allow the player to interact with the game, select his or her bets from the Palettes of Betting Opportunities and to activate the bet button. One or both of the displays may display the Game Play Grid, or may display multiple Game Play Grids. Multiple gaming machines running electronic games according to an embodiment of the present invention may be coupled to one another via a local and/or wide area network. Each of the gaming machines (e.g., GM1, GM2, ..., GMn) may be running the same multi-act electronic game or different multi-act electronic games. Alternatively still one or more of the gaming machines (GM1, GM2, ..., GMn) may be running a multi-act game according to an embodiment of the present invention, while others of the gaming machines may be running different (e.g., non multi-act) games altogether. Alternatively still, the gaming machines (GM1, GM2, ..., GMn) may each be running multi-act games that appear different, but may all be running multi-act games that adhere to the same storyboard. For example, as shown in FIG. 17, although each of the gaming machines appears to be running different multi-act games (e.g., railroad tracks, roads and pipelines), each of the multi-act games may adhere to the same three act storyboard that includes a construction first act, a testing and/or snag second act, followed by a third act that includes a denouement or resolution in which the player may be rewarded and/or informed of the results of any pending bets.

According to further embodiments, the top screen in each gaming machine may display elements that illustrate or animate the act as it unfolds. The act number being unfolded may be the result of a player playing in the network of gaming machines having won a particular bet that caused the jump to a different or higher act sequence number. In other words, other players on other gaming machines within the network of gaming machines may influence the sequence with which the acts unfold and/or other aspects of game play. The other players in the network of gaming machines may then be invited to join the act currently unfolding and place bets on the betting opportunities offered by that act, thereby creating an ad-hoc community of players on adjacent or nearby gaming machines. For example, assuming that the network of gaming machines (or a bank of gaming machines within the network of gaming machines) offers a quest game to be played on all the gaming machines in the bank, and that a player wins a prize that, in addition to credits, awards him or her the mystery bonus "Magic Sword", the story may then jump to an act entitled "Fight The Dragon." All the top screens in the bank may then display an animated dragon fight as shown in FIG. 17, thus inviting other players to join and try to place bets on the betting opportunities related to that dragon fight act, hoping to be the or a winner of that act by predicting and placing a bet on which event will eventually cause the death of the dragon (or the knight). Consequently, the quest may move from act to act according to randomly selected winnings for bets placed by players in the banks of gaming machines, thus giving the players the impression that they are controlling the unfolding of the quest or giving them an urge to play more or longer in order to have a greater chance of controlling the quest's direction.

Figure 18:
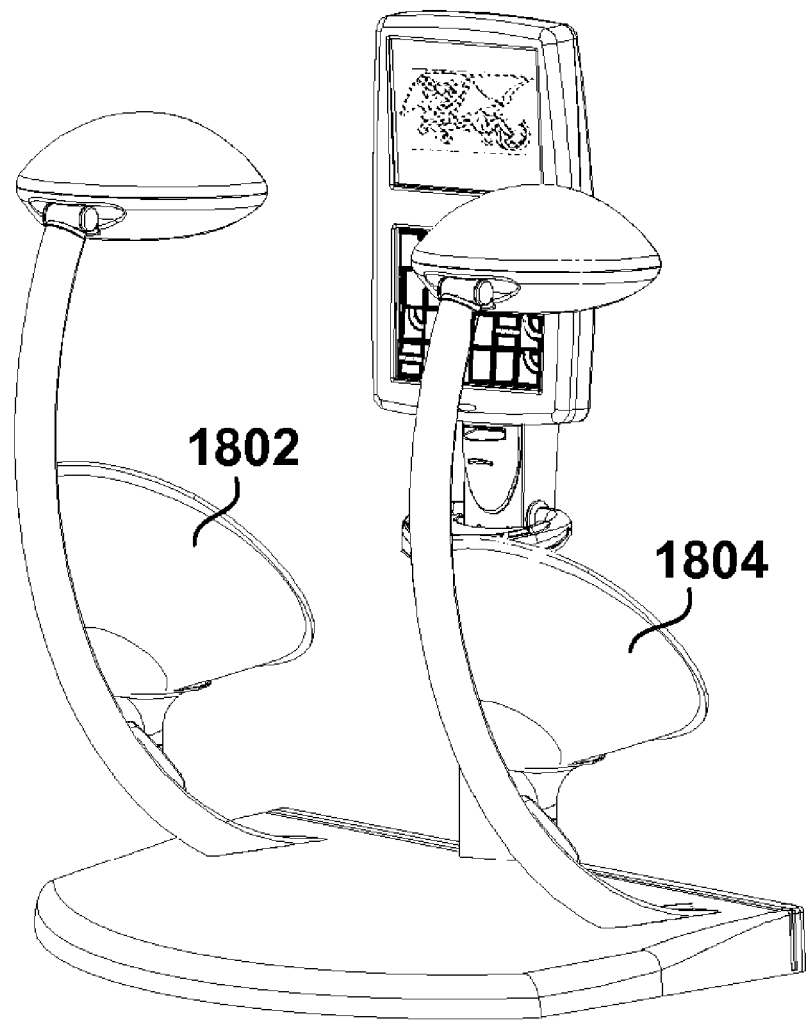
FIG. 18 shows a two player gaming machine suitable to implement embodiments of the present invention.

Multi-act games may be provided, as shown in FIG. 18 that are optimized for two players. Such two player games may require input from both players to cause the game to progress through the storyboard and/or may pit the two players against each other.

The network of gaming machines (or a bank of gaming machines within the network) may be configured to receive software downloads from a peer gaming machine in the network and/or from a central server also coupled to the network. Methods and systems for doing so are disclosed in the co-pending and commonly assigned US patent application entitled Universal Game Server, Ser. No. 10/656,631 filed on Sep. 4, 2003, attorney reference CYBS5872 and in the co-pending and commonly assigned US patent application entitled Dynamic Configuration Of A Gaming System, Ser. No. 10/789,975 filed on Feb. 27, 2004, attorney reference CYBS5858, the disclosures of which are hereby incorporated herein in their entirety. Such software downloads may include software patches, updates, updated pay tables, new acts to be inserted in the multi-act games available at the gaming machine (all subject to applicable laws and local gaming regulations), to identify but a few possibilities.

In order to preserve the simplicity of legacy electronic games, embodiments of the present invention may offer player-selectable levels of complexity. For example, a player new to this class of game may elect to play a Basic Mode with fewer features, uncluttered screens, and more straight-forward game play. In the Basic Mode, the number of available betting opportunities may be deliberately limited, so as not to detract novice players from the rhythm of the unfolding story. As players become more familiar with these Multi-Act games or desire new and greater adventures and a richer range of betting opportunities, they may choose to select Intermediate or Advanced play modes. For example, additional icons may be, present in Intermediate and Advanced play modes, alerting the player of the presence of additional Palettes of Betting Opportunities, each associated with predetermined pay table or tables. Such icons may be hidden or subdued in the Basic Mode of play. Different play modes (e.g., Basic, Intermediate or Advanced) may be player-selected at each act of the multi-act games according to embodiments of the present invention.

Embodiments of the present invention may also include one or more secondary games that may be embedded into the primary multi-act game. Examples of such secondary games are disclosed in co-pending and commonly assigned U.S. patent application Ser. No. 60/661,844 filed on Mar. 14, 2005, attorney reference number CYBS5972P, which is incorporated herein in its entirety. Such secondary games may allow the player to take a break from the multi-act game, play a secondary game and return to the multi-act game at the conclusion of the secondary game, without relinquishing his or her gaming machine and/or without disturbing the flow of story unfolding.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A regulated creative game of chance for a video gaining machine, comprising:
   a computer;
   at least one display;
   a plurality of acts, each configured to unfold on the at least one display in accordance with a predetermined storyline;
   a plurality of stages, each of the stages being associated with at least one of the plurality of acts;
   an interface configured to enable a player to select one of the plurality of acts and to cause the at least one display to show a stage associated with the selected one of the plurality of acts;
   a palette of betting opportunities displayed on the at least one display, the palette of betting opportunities including a plurality of available betting opportunities that are related to the selected act and to the associated stage shown on the display;

a palette of chips that includes a plurality of available betting chips;

the interface being further configured to enable the player to prepare the stage by enabling the player to repeatedly select any betting opportunity from among the palette of betting opportunities and to add the selected betting opportunity to the associated stage, the interface being further configured to enable the player to select at least one betting chip from the palette of chips and to place at least one bet with the selected at least one betting chip on at least one of the added betting opportunity, and a random number generator coupled to the computer to determine an outcome of the at least one bet subsequent to the player activating a bet command.

2. The regulated creative game of chance of claim 1, wherein the interface is further configured to enable the player to remove the added betting opportunity from the associated stage.

3. The regulated creative game of chance of claim 1, wherein at least one of the plurality of available betting opportunities further comprises at least one attribute and, wherein the interface is further configured to enable the player to modify at least one attribute of added betting opportunity.

4. The regulated creative game of chance of claim 3, wherein the at least one attribute of the added betting opportunity includes hair color when the betting opportunity is a person, at least one of make and model when the betting opportunity is a car, and at least one of placement, orientation and quality when the betting opportunity is a part.

5. The regulated creative game of chance of claim 1, wherein the interface is configured to enable the player to activate the bet command a plurality of times during each of the plurality of acts.

6. The regulated creative game of chance of claim 1, wherein the predetermined storyline is initialized in a first act, tested in a second act and resolved in a third act.

7. The regulated creative game of chance of claim 1, wherein the associated stage includes a game play grid that includes a plurality of grid segments and wherein the interface is further configured to enable the player to place the selected betting opportunity on at least one of the plurality of grid segments.

8. The regulated creative game of chance of claim 7, wherein the game play grid is fragmented in a regular manner.

9. The regulated creative game of chance of claim 7, wherein the game play grid is fragmented in an irregular manner.

10. The regulated creative game of chance of claim 7, wherein the game play grid is three-dimensional.

11. The regulated creative game of chance of claim 7, wherein the game play grid includes a map and wherein each grid segment represents a province or territory.

12. The regulated creative game of chance of claim 1, wherein the predetermined storyline includes an unfolding of a construction project.

13. The regulated creative game of chance of claim 12, wherein the construction project includes a first act that includes building the construction project, a second act that includes testing the construction project and discovering construction snags and a third act that includes a resolution of the discovered construction snags.

14. The regulated creative game of chance of claim 12, wherein the construction project includes at least one of a completion of a road, a pipeline, railroad tracks, an electrical wiring, a river, a labyrinth and an ignition cord.

15. The regulated creative game of chance of claim 12, wherein the plurality of betting opportunities of the palette of betting opportunities includes factory parts to be added to the associated stage to build or improve the construction project.

16. The regulated creative game of chance of claim 12, wherein the plurality of betting opportunities of the palette of betting opportunities includes damaging elements that are configured to damage or to destroy the construction project.

17. The regulated creative game of chance of claim 16, wherein the damaging elements include at least one of a tornado, an earthquake, an explosion, lightning, a meteor, a plane crash, a tsunami, an accidental perforation by a drill, an accidental rupture while digging a trench, a power grid failure, a hailstorm, a heat wave, a flood, a land slide, a poisoned water supply, a flat tire, a terrorist attack, and a poor quality of a construction material.

18. The regulated creative game of chance of claim 1, wherein the predetermined storyline includes a construction of a conduit for a liquid or an object to move from a source to a destination, the conduit including a plurality of conduit segments.

19. The regulated creative game of chance of claim 18, wherein an act of the plurality of acts includes an assembly of the conduit, wherein the plurality of betting opportunities includes at least one of an assembly part or a material associated with the assembly of the conduit, wherein the at least one betting opportunity includes at least one of a part type, part rotation, part size and part material compatibility and wherein, subsequent to the player activating the bet command, the liquid or object is shown on the at least one display attempting to advance from the source to the destination up to a location of a snag that stops or reduces a flow of the liquid or object, as determined by the computer with input from the random number generator.

20. The regulated creative game of chance of claim 18, wherein an act of the plurality of acts includes a testing of a fully assembled conduit, wherein at least one of the plurality of betting opportunities includes at least one of a source designation, a destination designation and a liquid type or a type of moving object related to the conduit and wherein the at least one betting opportunity includes at least one of fitting quality, material quality, corrosion state, degradation state, operating pressure and blow-out pressure of the conduit segments and wherein, subsequent to the player activating the bet command, the liquid or object is shown attempting to advance from the source to the destination up to a location of a snag that stops or reduces a flow of the liquid or object, as determined by the computer with input from the random number generator.

21. The regulated creative game of chance of claim 18, wherein an act of the plurality of acts includes a resolution of a fully assembled but damaged conduit, wherein the at least one of the plurality of betting opportunities includes at least one of a replacement part, an improved material, a fixing procedure and a tool related to the repair of the conduit, wherein the at least one betting opportunity includes at least one of fitting quality, material quality, corrosion state, degradation state, operating pressure and blow-out pressure and wherein, subsequent to the player activating the bet command, the liquid or object is shown attempting to advance from the source to the destination up to a location of a snag that stops or reduces a flow of the liquid or object, as determined by the computer with input from the random number generator.

22. The regulated creative game of chance of claim 1, wherein the predetermined storyline includes a journey of a character.

23. The regulated creative game of chance of claim 22, wherein the plurality of acts includes a first act in which a travel itinerary for the character is created, a second act in which the character travels along the created itinerary and overcomes travel snags and a third act that includes a resolution of the journey.

24. The regulated creative game of chance of claim 22, wherein the journey includes at least one of a hero's quest and a military mission.

25. The regulated creative game of chance of claim 1, wherein the predetermined storyline includes an emotional journey.

26. The regulated creative game of chance of claim 1, wherein the predetermined storyline includes a creation of a relationship.

27. The regulated creative game of chance of claim 26, wherein the plurality of acts includes a first act in which the relationship is created, a second act in which the relationship is tested and a third act in which the relationship is resolved.

28. The regulated creative game of chance of claim 26, wherein the relationship includes a romantic relationship.

29. A method of operating a video gaming machine to provide a player with a regulated creative game of chance, comprising the steps of:
providing a plurality of acts that unfold in accordance with a predetermined storyline;
prompting the player to select an act of the plurality of acts;
displaying a stage associated with the selected act;
providing a palette of betting opportunities that includes a plurality of available betting opportunities, each of the plurality of betting opportunities being related to the selected act and to the displayed associated stage;
prompting and enabling the player to repeatedly select any betting opportunity from among a plurality of available betting opportunities of the palette of betting opportunities and adding the selected betting opportunity to the associated stage;
providing a palette of chips that includes a plurality of available betting chips;
prompting the player to select at least one betting chip from the provided palette of chips and to place at least one bet with the selected at least one betting chip on at least one of the added betting opportunity, and
determining an outcome of the at least one bet in accordance with the selected betting opportunity subsequent to the player activating a bet command.

30. The method of claim 29, further comprising a step of enabling the player to remove the at least one added betting opportunity from the associated stage.

31. The method of claim 29, wherein at least one of the plurality of available betting opportunities further comprises at least one attribute and, wherein the method further includes a step of enabling the player to modify at least one attribute of the added betting opportunity.

32. The method of claim 31, wherein the at least one attribute of the added betting opportunity includes hair color when the betting opportunity is a person, at least one of make and model when the betting opportunity is a car, and at least one of placement, orientation and quality when the betting opportunity is a part.

33. The method of claim 29, further including a step of enabling the player to activate the bet command a plurality of times during each of the plurality of acts.

34. The method of claim 29, wherein the predetermined storyline is configured to be initialized in a first act, tested in a second act and resolved in a third act.

35. The method of claim 29, wherein the associated stage includes a game play grid that includes a plurality of grid segments and wherein the method further includes a step of enabling the player to place the selected betting opportunity on at least one of the plurality of grid segments.

36. The method of claim 35, further comprising a step of fragmenting the game play grid in a regular manner.

37. The method of claim 35, further comprising a step of fragmenting the game play grid in an irregular manner.

38. The method of claim 35, further comprising a step of providing the game play grid in a three-dimensional form.

39. The method of claim 35, further comprising a step of providing the game play grid with a map in which each grid segment represents a province or territory.

40. The method of claim 29, further comprising a step of configuring the predetermined storyline to include an unfolding of a construction project.

41. The method of claim 40, further comprising a step of configuring the construction project to include a first act that includes building the construction project, a second act that includes testing the construction project and discovering construction snags and a third act that includes a resolution of the discovered construction snags.

42. The method of claim 40, further comprising a step of configuring the construction project to include at least one of a completion of a road, a pipeline, railroad tracks, an electrical wiring, a river, a labyrinth and an ignition cord.

43. The method of claim 40, further comprising a step of configuring at least one betting opportunity of the plurality of available betting opportunities of the palette of betting opportunities to include factory parts to be added to the associated stage to build or improve the construction project.

44. The method of claim 40, further comprising a step of configuring at least one betting opportunity of the plurality of available betting opportunities of the palette of betting opportunities to include damaging elements that are configured to damage or to destroy the construction project.

45. The method of claim 44, further comprising a step of configuring the damaging elements to include at least one of a tornado, an earthquake, an explosion, lightning, a meteor, a plane crash, a tsunami, an accidental perforation by a drill, an accidental rupture while digging a trench, a power grid failure, a hailstorm, a heat wave, a flood, a land slide, a poisoned water supply, a flat tire, a terrorist attack, and a poor quality of a construction material.

46. The method of claim 29, further comprising a step of configuring the predetermined storyline to include a construction of a conduit for a liquid or an object to move from a source to a destination, the conduit including a plurality of conduit segments.

47. The method of claim 46, further comprising a step of configuring an act of the plurality of acts to include an assembly of the conduit, wherein the plurality of betting opportunities includes at least one of an assembly part or a material associated with the assembly of the conduit, wherein the at least one betting opportunity includes at least one of a part type, part rotation, part size and part material compatibility and wherein, subsequent to the player activating the bet command, the liquid or object is shown on the at least one display attempting to advance from the source to the destination up to a location of a snag that stops or reduces a flow of the liquid or object, as determined by the outcome determining step.

48. The method of claim 46, further comprising a step of configuring an act of the plurality of acts to include a testing of a fully assembled conduit, wherein at least one betting opportunity of the plurality of available betting opportunities includes at least one of a source designation, a destination designation and a liquid type or a type of moving object related to the conduit and wherein the at least one betting opportunity includes at least one of fitting quality, material quality, corrosion state, degradation state, operating pressure and blow-out pressure of the conduit segments and wherein, subsequent to the player activating the bet command, the liquid or object is shown attempting to advance from the source to the destination tip to a location of a snag that stops or reduces a flow of the liquid or object, as determined by the outcome determining step.

49. The method of claim 46, further comprising a step of configuring an act of the plurality of acts to include a resolution of a fully assembled but damaged conduit, wherein at least one betting opportunity of the plurality of available betting opportunities includes at least one of a replacement part, an improved material, a fixing procedure and a tool related to the repair of the conduit, wherein the at least one betting opportunity includes at least one of fitting quality, material quality, corrosion state, degradation state, operating pressure and blow-out pressure and wherein, subsequent to the player activating the bet command, the liquid or object is shown attempting to advance from the source to the destination up to a location of a snag that stops or reduces a flow of the liquid or object, as determined by the outcome determining step.

50. The method of claim 29, further comprising a step of configuring the predetermined storyline includes a journey of a character.

51. The method of claim 50, further comprising a step of configuring the plurality of acts to include a first act in which a travel itinerary for the character is created, a second act in which the character travels along the created itinerary and overcomes travel snags and a third act that includes a resolution of the journey.

52. The method of claim 50, further comprising a step of configuring the journey to include at least one of a hero's quest and a military mission.

53. The method of claim 29, wherein further comprising a step of configuring the predetermined storyline to include an emotional journey.

54. The method of claim 29, further comprising a step of configuring the predetermined storyline to include a creation of a relationship.

55. The method of claim 54, further comprising a step of configuring the plurality of acts to include a first act in which the relationship is created, a second act in which the relationship is tested and a third act in which the relationship is resolved.

56. The method of claim 54, further comprising a step of configuring the relationship to include a romantic relationship.

57. A regulated creative game of chance for a video gaming machine, comprising:
- a plurality of acts unfolding in accordance with a predetermined storyline, the storyline including at least one of a conduit construction act, a conduit testing act and a conduit destruction act;
- an interface configured to enable a player of the video gaming machine to select one of the plurality of acts and to cause a display of a stage associated with the selected act;
- a palette of betting opportunities including a plurality of available betting opportunities, the plurality of available betting opportunities including at least one of conduit segments, construction parts, moving objects, sources, destinations and damaging elements;
- the interface being further configured to:
- enable the player to prepare the selected act, including enabling the player to repeatedly select any betting opportunity from among the plurality of available betting opportunities of the palette of betting opportunities and adding the selected betting opportunity to the stage associated with the selected act under preparation,
- enable the player to modify the preparation of the selected act including selecting at least one added betting opportunity, modifying an attribute of the at least one added betting opportunity or removing the at least one added betting opportunity;
- enable the player to place a bet related to the at least one added betting opportunity;
- a random outcome generator configured to, after the player activates a bet command, determine an outcome of the placed bet,
- wherein the conduit construction act includes a construction of the at least one conduit using a corresponding one of the plurality of available betting opportunities and a designation of a source and a destination for each of the at least one conduits using a corresponding one of the plurality of available betting opportunities, wherein the conduit testing act includes a selection of a moving object to be guided within each of the at least one conduits using a corresponding one of the plurality of available betting opportunities, and wherein the conduit destruction act includes a selection of at least one damaging element to damage the conduit using a corresponding one of the at least one betting opportunities.

58. The regulated creative game of chance according to claim 57, wherein the plurality of acts are combined into a single act.

59. The regulated creative game of chance according to claim 57, wherein the interface is further configured to enable the player to modify the preparation of an act within a predetermined time.

60. The regulated creative game of chance of claim 59, wherein the predetermined time is a function of a location of the object moving within each of the at least one conduits from the source to the destination.

61. The regulated creative game of chance of claim 59, wherein the predetermined time is elapsed when the object moving within each of at least one conduits reaches the destination.

62. The regulated creative game of chance of claim 59, wherein the predetermined time is elapsed when the object moving within each of the at least one conduits is affected by selected ones of the damaging elements.

* * * * *